US012761666B2

(12) United States Patent
Fujiwara et al.

(10) Patent No.: US 12,761,666 B2
(45) Date of Patent: Oct. 13, 2026

(54) OBSTACLE DETECTION SYSTEM, AGRICULTURAL MACHINE AND OBSTACLE DETECTION METHOD

(71) Applicant: Kubota Corporation, Osaka (JP)

(72) Inventors: Nagahiro Fujiwara, Sakai (JP); Shunsuke Miyashita, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 73 days.

(21) Appl. No.: 18/746,108

(22) Filed: Jun. 18, 2024

(65) Prior Publication Data

US 2024/0338033 A1 Oct. 10, 2024

Related U.S. Application Data

(63) Continuation of application No. PCT/JP2022/043045, filed on Nov. 21, 2022.

(30) Foreign Application Priority Data

Dec. 24, 2021 (JP) ................................ 2021-210793

(51) Int. Cl.

*G05D 1/622* (2024.01)
*G01S 17/86* (2020.01)

(Continued)

(52) U.S. Cl.

CPC .............. *G05D 1/622* (2024.01); *G01S 17/86* (2020.01); *G01S 17/931* (2020.01); *G05D 1/242* (2024.01);

(Continued)

(58) Field of Classification Search

CPC .... G05D 1/622; G05D 1/242; G05D 2105/15; G05D 2107/21; G05D 2111/10;

(Continued)

(56) References Cited

U.S. PATENT DOCUMENTS 9,234,618 B1 * 1/2016 Zhu .................. B60W 60/0016
2016/0116593 A1 * 4/2016 Kim ..................... G01S 17/931
356/5.01

(Continued)

FOREIGN PATENT DOCUMENTS

CN 104765366 B 3/2017
CN 212556197 U 2/2021

(Continued)

OTHER PUBLICATIONS

Translation of JP-2017050829-A, 8 pages (Year: 2017).*

*Primary Examiner* — Dale W Hilgendorf
(74) *Attorney, Agent, or Firm* — Keating & Bennett, LLP

(57) ABSTRACT

An obstacle detection system for an agricultural machine to perform self-driving while sensing a surrounding environment with a LiDAR sensor and a camera includes a controller configured or programmed to cause the camera, upon detecting an obstacle candidate based on data that is output from the LiDAR sensor, as a trigger, to acquire an image of the obstacle candidate, and determine whether or not to change a traveling status of the agricultural machine based on the image of the obstacle candidate acquired with the camera.

7 Claims, 15 Drawing Sheets

(51) Int. Cl.

| | |
|---|---|
| ***G01S 17/931*** | (2020.01) |
| ***G05D 1/242*** | (2024.01) |
| ***G05D 105/15*** | (2024.01) |
| ***G05D 107/20*** | (2024.01) |
| ***G05D 111/10*** | (2024.01) |
| ***G06V 10/141*** | (2022.01) |
| ***G06V 10/56*** | (2022.01) |
| ***G06V 20/58*** | (2022.01) |

(52) U.S. Cl.
CPC ......... *G06V 20/58* (2022.01); *G05D 2105/15* (2024.01); *G05D 2107/21* (2024.01); *G05D 2111/10* (2024.01); *G06V 10/141* (2022.01); *G06V 10/56* (2022.01)

(58) Field of Classification Search
CPC ....... G01S 17/86; G01S 17/931; G06V 20/58; G06V 10/141; G06V 10/56
See application file for complete search history.

(56) References Cited

U.S. PATENT DOCUMENTS

| | | | | |
|---|---|---|---|---|
| 2017/0176597 | A1* | 6/2017 | Gruver | G01S 7/4808 |
| 2017/0357267 | A1* | 12/2017 | Foster | A01B 69/008 |
| 2018/0267170 | A1* | 9/2018 | Kuroda | G06V 20/58 |
| 2018/0288320 | A1* | 10/2018 | Melick | G01S 13/931 |
| 2018/0319396 | A1* | 11/2018 | Foster | B60W 30/0956 |
| 2019/0098825 | A1* | 4/2019 | Neitemeier | G05D 1/0246 |
| 2019/0317521 | A1 | 10/2019 | Nishi et al. | |
| 2019/0382005 | A1* | 12/2019 | Nishi | B60W 30/09 |
| 2020/0019160 | A1* | 1/2020 | McArthur | G01S 7/52004 |
| 2020/0098394 | A1* | 3/2020 | Levinson | G01S 7/497 |
| 2020/0262377 | A1* | 8/2020 | Salter | B60Q 1/2661 |
| 2021/0000006 | A1* | 1/2021 | Ellaboudy | A01B 69/001 |
| 2021/0201054 | A1* | 7/2021 | Toth | B60R 11/04 |
| 2021/0241026 | A1* | 8/2021 | Deng | G01S 7/497 |
| 2021/0382490 | A1* | 12/2021 | Wilson | G06V 20/58 |
| 2022/0091271 | A1* | 3/2022 | Iwase | G01S 17/931 |
| 2022/0146982 | A1* | 5/2022 | Paxman | G03H 1/0005 |
| 2022/0230444 | A1 | 7/2022 | Edo et al. | |
| 2022/0324437 | A1* | 10/2022 | Blau | G01C 21/3848 |
| 2023/0089733 | A1* | 3/2023 | Avram | B60W 10/18<br>701/28 |
| 2023/0139751 | A1* | 5/2023 | Sanderovich | G01S 13/89<br>382/103 |
| 2023/0204781 | A1* | 6/2023 | Thakur | G01S 17/894<br>356/5.01 |
| 2023/0221728 | A1* | 7/2023 | Iwase | G06V 20/56<br>701/50 |

FOREIGN PATENT DOCUMENTS

| | | | | | |
|---|---|---|---|---|---|
| JP | 2819551 | B2 | | 10/1998 | |
| JP | 2017050829 | A | * | 3/2017 | H04N 5/232 |
| JP | 2019152924 | A | | 9/2019 | |
| JP | 6680701 | B2 | | 4/2020 | |
| JP | 2020168953 | A | | 10/2020 | |
| JP | 2020-178659 | A | | 11/2020 | |
| JP | 2021006011 | A | | 1/2021 | |
| JP | 2021015340 | A | | 2/2021 | |
| JP | 2021-29218 | A | | 3/2021 | |
| JP | 2021144594 | A | | 9/2021 | |
| JP | 6962166 | B2 | | 11/2021 | |

* cited by examiner

OBSTACLE DETECTION SYSTEM, AGRICULTURAL MACHINE AND OBSTACLE DETECTION METHOD

CROSS REFERENCE TO RELATED APPLICATIONS

This application claims the benefit of priority to Japanese Patent Application No. 2021-210793 filed on Dec. 24, 2021 and is a Continuation Application of PCT Application No. PCT/JP2022/043045 filed on Nov. 21, 2022. The entire contents of each application are hereby incorporated herein by reference.

BACKGROUND OF THE INVENTION

1. Field of the Invention

The present disclosure relates to obstacle detection systems for agricultural machines to perform self-driving, agricultural machines including such obstacle detection systems, and obstacle detection methods.

2. Description of the Related Art

Research and development has been directed to the automation of agricultural machines. For example, work vehicles, such as tractors, combines, and rice transplanters, which automatically travel within fields by utilizing a positioning system, e.g., a GNSS (Global Navigation Satellite System), are coming into practical use. Research and development is also under way for work vehicles which automatically travel not only within fields, but also outside the fields. Japanese Laid-Open Patent Publication No. 2021-029218 discloses a system to cause unmanned work vehicles to automatically travel between two fields separated from each other with a road being sandwiched therebetween. Japanese Laid-Open Patent Publication No. 2020-178659 discloses a harvester which can automatically travel and detects an obstacle in fields by images captured by stereo camera units.

SUMMARY OF THE INVENTION

When an agricultural machine performs self-driving, it is required to detect obstacles with good accuracy while reducing the processing load for obstacle detection.

Example embodiments of the present invention provide systems to detect obstacles for agricultural machines to perform self-driving, which can detect obstacles with good accuracy while reducing the processing load for obstacle detection.

An obstacle detection system according to an example embodiment of the present disclosure is an obstacle detection system for an agricultural machine to perform self-driving while sensing a surrounding environment with a LiDAR sensor and a camera, the obstacle detection system including a controller configured or programmed to cause the camera, upon detecting an obstacle candidate based on data that is output from the LiDAR sensor, as a trigger, to acquire an image of the obstacle candidate, and determine whether or not to change a traveling status of the agricultural machine based on the image of the obstacle candidate acquired with the camera.

General or specific aspects of the present disclosure may be implemented using a device, a system, a method, an integrated circuit, a computer program, a non-transitory computer-readable storage medium, or any combination thereof. The computer-readable storage medium may be inclusive of a volatile storage medium or a non-volatile storage medium. The device may include a plurality of devices. In the case where the device includes two or more devices, the two or more devices may be disposed within a single apparatus, or divided over two or more separate apparatuses.

According to example embodiments of the present disclosure, systems to detect obstacles for agricultural machines to perform self-driving, which can detect obstacles with good accuracy while reducing the processing load for obstacle detection, are provided.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Figure 1:
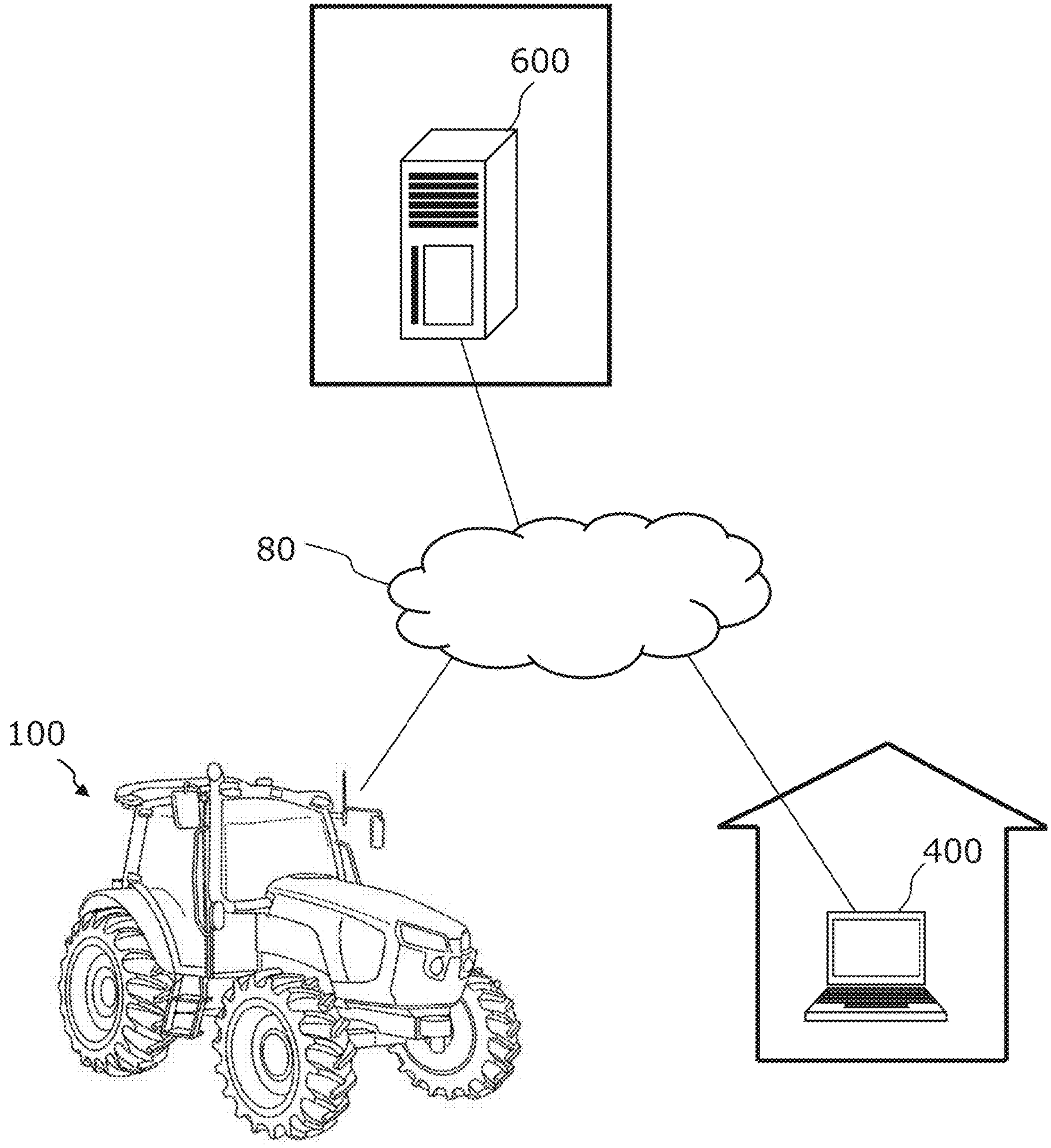
FIG. 1 is a diagram providing an overview of an agriculture management system according to an illustrative example embodiment of the present invention.

In the present disclosure, an "agricultural machine" refers to a machine for agricultural applications. Examples of agricultural machines include tractors, harvesters, rice transplanters, vehicles for crop management, vegetable transplanters, mowers, seeders, spreaders, and mobile robots for agriculture. Not only may a work vehicle such as a tractor function as an "agricultural machine" alone by itself, but also a combination of a work vehicle and an implement that is attached to, or towed by, the work vehicle may function as an "agricultural machine". For the ground surface inside a field, the agricultural machine performs agricultural work such as tilling, seeding, preventive pest control, manure spreading, planting of crops, or harvesting. Such agricultural work or tasks may be referred to as "groundwork", or simply as "work" or "tasks". Travel of a vehicle-type agricultural machine performed while the agricultural machine also performs agricultural work may be referred to as "tasked travel".

"Self-driving" refers to controlling the movement of an agricultural machine by the action of a controller, rather than through manual operations of a driver. An agricultural machine that performs self-driving may be referred to as a "self-driving agricultural machine" or a "robotic agricultural machine". During self-driving, not only the movement of the agricultural machine, but also the operation of agricultural work (e.g., the operation of the implement) may be controlled automatically. In the case where the agricultural machine is a vehicle-type machine, travel of the agricultural machine via self-driving will be referred to as "self-traveling". The controller may be configured or programmed to control at least one of steering that is required during the movement of the agricultural machine, adjustment of the moving speed, or beginning and ending of a move. In the case of controlling a work vehicle having an implement attached thereto, the controller may be configured or programmed to control raising or lowering of the implement, beginning and ending of an operation of the implement, and so on. A move based on self-driving may include not only moving of an agricultural machine that goes along a predetermined path toward a destination, but also moving of an agricultural machine that follows a target of tracking. An agricultural machine that performs self-driving may also move partly based on the user's instructions. Moreover, an agricultural machine that performs self-driving may operate not only in a self-driving mode but also in a manual driving mode, where the agricultural machine moves through manual operations of the driver. When performed not manually but through the action of a controller, the steering of an agricultural machine will be referred to as "automatic steering". A portion of, or the entirety of, the controller may reside outside the agricultural machine. Control signals, commands, data, etc., may be communicated between the agricultural machine and a controller residing outside the agricultural machine. An agricultural machine that performs self-driving may move autonomously while sensing the surrounding environment, without any person being involved in the controlling of the movement of the agricultural machine. An agricultural machine that is capable of autonomous movement is able to travel inside the field or outside the field (e.g., on roads) in an unmanned manner. During an autonomous move, operations of detecting and avoiding obstacles may be performed.

A "work plan" is data defining a plan of one or more tasks of agricultural work to be performed by an agricultural machine. The work plan may include, for example, information representing the order of the tasks of agricultural work to be performed by an agricultural machine or the field where each of the tasks of agricultural work is to be performed. The work plan may include information representing the time and the date when each of the tasks of agricultural work is to be performed. The work plan may be created by a processor communicating with the agricultural machine to manage the agricultural machine or a processor mounted on the agricultural machine. The processor can create a work plan based on, for example, information input by the user (agricultural business executive, agricultural worker, etc.) manipulating a terminal device. In this specification, the processor configured or programmed to communicate with the agricultural machine to manage the agricultural machine will be referred to as a "management device". The management device may manage agricultural work of a plurality agricultural machines. In this case, the management device may create a work plan including information on each task of agricultural work to be performed by each of the plurality of agricultural machines. The work plan may be downloaded to each of the agricultural machines and stored in a storage in each of the agricultural machines. In order to perform the scheduled agricultural work in accordance with the work plan, each agricultural machine can automatically move to a field and perform the agricultural work.

An "environment map" is data representing, with a predetermined coordinate system, the position or the region of an object existing in the environment where the agricultural machine moves. The environment map may be referred to simply as a "map" or "map data". The coordinate system defining the environment map is, for example, a world coordinate system such as a geographic coordinate system fixed to the globe. Regarding the object existing in the environment, the environment map may include information other than the position (e.g., attribute information or other types of information). The "environment map" encompasses various type of maps such as a point cloud map and a lattice map. Data on a local map or a partial map that is generated or processed in a process of constructing the environment map is also referred to as a "map" or "map data".

An "agricultural road" is a road used mainly for agriculture. An "agricultural road" is not limited to a road paved with asphalt, and encompasses unpaved roads covered with soil, gravel or the like. An "agricultural road" encompasses roads (including private roads) on which only vehicle-type agricultural machines (e.g., work vehicles such as tractors, etc.) are allowed to travel and roads on which general vehicles (automobiles, trucks, buses, etc.) are also allowed to travel. The work vehicles may automatically travel on a general road in addition to an agricultural road. The "general road" is a road maintained for traffic of general vehicles.

Hereinafter, example embodiments of the present disclosure will be described. Note, however, that unnecessarily detailed descriptions may be omitted. For example, detailed descriptions on what is well known in the art or redundant descriptions on what is substantially the same configuration may be omitted. This is to avoid lengthy description, and facilitate the understanding of those skilled in the art. The accompanying drawings and the following description, which are provided by the present inventors so that those skilled in the art can sufficiently understand the present disclosure, are not intended to limit the scope of the claims. In the following description, elements, features, characteristics, etc., having identical or similar functions are denoted by identical reference numerals.

The following example embodiments are only exemplary, and the techniques according to the present disclosure are not limited to the following example embodiments. For example, numerical values, shapes, materials, steps, orders of steps, layout of a display screen, etc., which are indicated in the following example embodiments are only exemplary, and admit of various modifications so long as it makes technological sense. Any one implementation may be combined with another so long as it makes technological sense to do so.

Hereinafter, example embodiments in which techniques according to the present disclosure are applied to work vehicles, such as tractors, which are examples of agricultural machines, will be mainly described. The techniques according to the present disclosure are also applicable to other types of agricultural machines in addition to the work vehicle such as a tractor.

FIG. 1 is a diagram providing an overview of an agriculture management system according to an illustrative example embodiment of the present disclosure. The agriculture management system shown in FIG. 1 includes a work vehicle 100, a terminal device 400, and a management device 600. The terminal device 400 is a computer used by a user performing remote monitoring of the work vehicle 100. The management device 600 is a computer managed by a business operator running the agriculture management system. The work vehicle 100, the terminal device 400 and the management device 600 can communicate with each other via the network 80. FIG. 1 shows one work vehicle 100, but the agriculture management system may include a plurality of the work vehicles or any other agricultural machine.

The work vehicle 100 according to the present example embodiment is a tractor. The work vehicle 100 can have an implement attached to its rear and/or its front. While performing agricultural work in accordance with a particular type of implement, the work vehicle 100 is able to travel inside a field. The work vehicle 100 may travel inside the field or outside the field with no implement being attached thereto.

The work vehicle 100 has a self-driving function. In other words, the work vehicle 100 can travel by the action of a controller, rather than manually. The controller according to the present example embodiment is provided inside the work vehicle 100, and is configured or programmed to control both the speed and steering of the work vehicle 100. The work vehicle 100 can perform self-traveling outside the field (e.g., on roads) as well as inside the field.

The work vehicle 100 includes a device usable for positioning or localization, such as a GNSS receiver or a LiDAR sensor. Based on the position of the work vehicle 100 and information on a target path, the controller of the work vehicle 100 is configured or programmed to cause the work vehicle 100 to automatically travel. In addition to controlling the travel of the work vehicle 100, the controller also can be configured or programmed to control the operation of the implement. As a result, while automatically traveling inside the field, the work vehicle 100 is able to perform agricultural work by using the implement. In addition, the work vehicle 100 is able to automatically travel along the target path on a road outside the field (e.g., an agricultural road or a general road). The work vehicle 100 automatically travels along the road outside the field by utilizing data that is output from a sensing device, such as a camera or a LiDAR sensor.

The management device 600 is a computer to manage the agricultural work performed by the work vehicle 100. The management device 600 may be, for example, a server computer that performs centralized management on information regarding the field on the cloud and supports agriculture by use of the data on the cloud. The management device 600, for example, creates a workplan for the work vehicle 100 and causes work vehicle 100 to perform agricultural work in accordance with the work plan.

The management device 600 generates a target path inside the field based on, for example, information input by the user by use of the terminal device 400 or any other device.

In addition, the management device 600 may generate or edit an environment map based on data collected by the work vehicle 100 or any other movable body by use of the sensing device such as a LiDAR sensor. The management device 600 transmits data on the work plan, the target path and the environment map thus generated to the work vehicle 100. The work vehicle 100 automatically moves and performs agricultural work based on the data.

The terminal device 400 is a computer that is used by a user who is at a remote place from the work vehicle 100. The terminal device 400 shown in FIG. 1 is a laptop computer, but the terminal device 400 is not limited to this. The terminal device 400 may be a stationary computer such as a desktop PC (personal computer), or a mobile terminal such as a smartphone or a tablet computer. The terminal device 400 may be used to perform remote monitoring of the work vehicle 100 or remote-manipulate the work vehicle 100. For example, the terminal device 400 can display, on a display screen thereof, a video captured by one or more cameras (imagers) included in the work vehicle 100. The terminal device 400 can also display, on the display screen thereof, a setting screen allowing the user to input information necessary to create a work plan (e.g., a schedule of each task of agricultural work) for the work vehicle 100. When the user inputs necessary information to the setting screen and performs a manipulation to transmit the information, the terminal device 400 transmits the input information to the management device 600. The management device 600 creates a work plan based on the information. The terminal device 400 may further have a function of displaying, on a display screen thereof, a setting screen allowing the user to input information necessary to set a target path.

Hereinafter, a configuration and an operation of the system according to the present example embodiment will be described in more detail.

Figure 2:
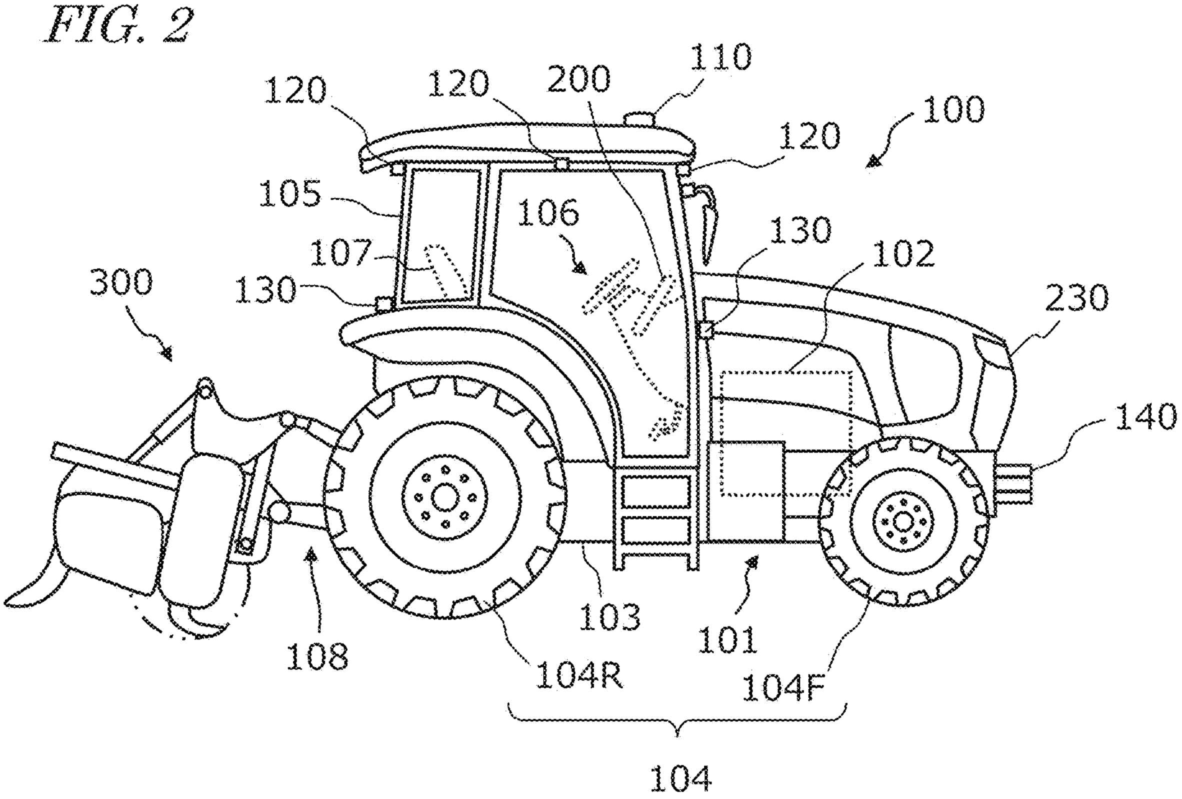
FIG. 2 is a side view schematically showing an example of a work vehicle and an example of an implement that is linked to the work vehicle.

FIG. 2 is a side view schematically showing an example of the work vehicle 100 and an example of implement 300 linked to the work vehicle 100. The work vehicle 100 according to the present example embodiment can operate both in a manual driving mode and a self-driving mode. In the self-driving mode, the work vehicle 100 is able to perform unmanned travel. The work vehicle 100 can perform self-driving both inside a field and outside the field.

As shown in FIG. 2, the work vehicle 100 includes a vehicle body 101, a prime mover (engine) 102, and a transmission 103. On the vehicle body 101, wheels 104 with tires and a cabin 105 are provided. The wheels 104 include a pair of front wheels 104F and a pair of rear wheels 104R. Inside the cabin 105, a driver's seat 107, a steering device 106, an operational terminal 200, and switches for manipulation are provided. In the case where the work vehicle 100 performs tasked travel inside the field, the front wheels 104F and/or the rear wheels 104R may be replaced by a plurality of wheels (crawlers) to which a continuous track is attached, instead of tire-mounted wheels.

The work vehicle 100 includes at least one sensing device sensing the surroundings of the work vehicle 100. In the example shown in FIG. 2, the work vehicle 100 includes a plurality of sensing devices. The sensing devices include a plurality of cameras 120, a LiDAR sensor 140, and a plurality of obstacle sensors 130.

The cameras 120 may be provided at the front/rear/right/left of the work vehicle 100, for example. The cameras 120 image the surrounding environment of the work vehicle 100 and generate image data. The images acquired with the cameras 120 may be transmitted to the terminal device 400, which is responsible for remote monitoring. The images may be used to monitor the work vehicle 100 during unmanned driving. The cameras 120 may also be used to generate images to allow the work vehicle 100, traveling on a road outside the field (an agricultural road or a general road), to recognize objects, obstacles, white lines, road signs, traffic signs or the like in the surroundings of the work vehicle 100.

The LiDAR sensor 140 in the example shown in FIG. 2 is disposed on a bottom portion of a front surface of the vehicle body 101. The LiDAR sensor 140 may be disposed at any other position. For example, the LiDAR sensor 140 may be disposed on the top portion of the cabin 105. The LiDAR sensor 140 may be a 3D-LiDAR sensor, but also a 2D-LiDAR sensor. The LiDAR sensor 140 senses the surrounding environment of the work vehicle 100 and outputs the sensing data. While the work vehicle 100 is traveling, the LiDAR sensor 140 repeatedly outputs sensor data representing the distance and the direction between an object existing in the surrounding environment thereof and each of measurement points, or a two-dimensional or three-dimensional coordinate values of each of the measurement points. The sensor data that is output from the LiDAR sensor 140 is processed by the controller of the work vehicle 100. The controller can perform localization of the work vehicle 100 by matching the sensor data against the environment map. The controller can further detect an object such as an obstacle existing in the surroundings of the work vehicle 100 based on the sensor data. The controller can utilize an algorithm such as, for example, SLAM (Simultaneous Localization and Mapping) to generate or edit an environment map. The work vehicle 100 may include a plurality of LiDAR sensors disposed at different positions with different orientations.

The plurality of obstacle sensors 130 shown in FIG. 2 are provided at the front and the rear of the cabin 105. The obstacle sensors 130 may be disposed at other positions. For example, one or more obstacle sensors 130 may be disposed at any position at the sides, the front or the rear of the vehicle body 101. The obstacle sensors 130 may include, for example, a laser scanner or an ultrasonic sonar. The obstacle sensors 130 may be used to detect obstacles in the surroundings of the work vehicle 100 during self-traveling to cause the work vehicle 100 to halt or detour around the obstacles. The LiDAR sensor 140 may be used as one of the obstacle sensors 130. Further, as described later, the LiDAR sensor 140 and the cameras 120 may be used in cooperation as sensors to detect the obstacle.

The work vehicle 100 further includes a GNSS unit 110. The GNSS unit 110 includes a GNSS receiver. The GNSS receiver may include an antenna to receive a signal(s) from a GNSS satellite(s) and a processor to calculate the position of the work vehicle 100 based on the signal(s) received by the antenna. The GNSS unit 110 receives satellite signals transmitted from the plurality of GNSS satellites, and performs positioning based on the satellite signals. GNSS is the general term for satellite positioning systems such as GPS (Global Positioning System), QZSS (Quasi-Zenith Satellite System; e.g., MICHIBIKI), GLONASS, Galileo, and BeiDou. Although the GNSS unit 110 according to the present example embodiment is disposed above the cabin 105, it may be disposed at any other position.

The GNSS unit 110 may include an inertial measurement unit (IMU). Signals from the IMU can be used to complement position data. The IMU can measure a tilt or a small motion of the work vehicle 100. The data acquired by the IMU can be used to complement the position data based on the satellite signals, so as to improve the performance of positioning.

The controller of the work vehicle 100 may utilize, for positioning, the sensing data acquired with the sensing devices such as the cameras 120 or the LIDAR sensor 140, in addition to the positioning results provided by the GNSS unit 110. In the case where objects serving as characteristic points exist in the environment that is traveled by the work vehicle 100, as in the case of an agricultural road, a forest road, a general road or an orchard, the position and the orientation of the work vehicle 100 can be estimated with a high accuracy based on data that is acquired by the cameras 120 or the LiDAR sensor 140 and on an environment map that is previously stored in the storage. By correcting or complementing position data based on the satellite signals using the data acquired with the cameras 120 or the LiDAR sensor 140, it becomes possible to identify the position of the work vehicle 100 with a higher accuracy.

The work vehicle 100 further includes one or more lights 230. In FIG. 2, only one light 230 is exemplified, however, various lights 230 such as headlights, work lights, and clearance lights may be provided at a plurality of positions of the work vehicle 100. These lights 230 are controlled by the controller.

The prime mover 102 may be a diesel engine, for example. Instead of a diesel engine, an electric motor may be used. The transmission 103 can change the propulsion and the moving speed of the work vehicle 100 through a speed changing mechanism. The transmission 103 can also switch between forward travel and backward travel of the work vehicle 100.

The steering device 106 includes a steering wheel, a steering shaft connected to the steering wheel, and a power steering device to assist in the steering by the steering wheel. The front wheels 104F are the steered wheels, such that changing their angle of turn (also referred to as "steering angle") can cause a change in the traveling direction of the work vehicle 100. The steering angle of the front wheels 104F can be changed by manipulating the steering wheel. The power steering device includes a hydraulic device or an electric motor to supply an assisting force to change the steering angle of the front wheels 104F. When automatic steering is performed, under the control of the controller disposed in the work vehicle 100, the steering angle may be automatically adjusted by the power of the hydraulic device or the electric motor.

A linkage device 108 is provided at the rear of the vehicle body 101. The linkage device 108 includes, e.g., a three-point linkage (also referred to as a “three-point link” or a “three-point hitch”), a PTO (Power Take Off) shaft, a universal joint, and a communication cable. The linkage device 108 allows the implement 300 to be attached to, or detached from, the work vehicle 100. The linkage device 108 is able to raise or lower the three-point link with a hydraulic device, for example, thus changing the position and/or attitude of the implement 300. Moreover, motive power can be sent from the work vehicle 100 to the implement 300 via the universal joint. While towing the implement 300, the work vehicle 100 allows the implement 300 to perform a predetermined task. The linkage device may be provided at the front of the vehicle body 101. In that case, the implement can be connected at the front of the work vehicle 100.

Although the implement 300 shown in FIG. 2 is a rotary tiller, the implement 300 is not limited to a rotary tiller. For example, any arbitrary implement such as a seeder, a spreader, a transplanter, a mower, a rake implement, a baler, a harvester, a sprayer, or a harrow, can be connected to the work vehicle 100 for use.

The work vehicle 100 shown in FIG. 2 can be driven by human driving; alternatively, it may only support unmanned driving. In that case, component elements which are only required for human driving, e.g., the cabin 105, the steering device 106, and the driver’s seat 107 do not need to be provided in the work vehicle 100. An unmanned work vehicle 100 can travel via autonomous driving, or by remote operation by a user.

Figure 3:
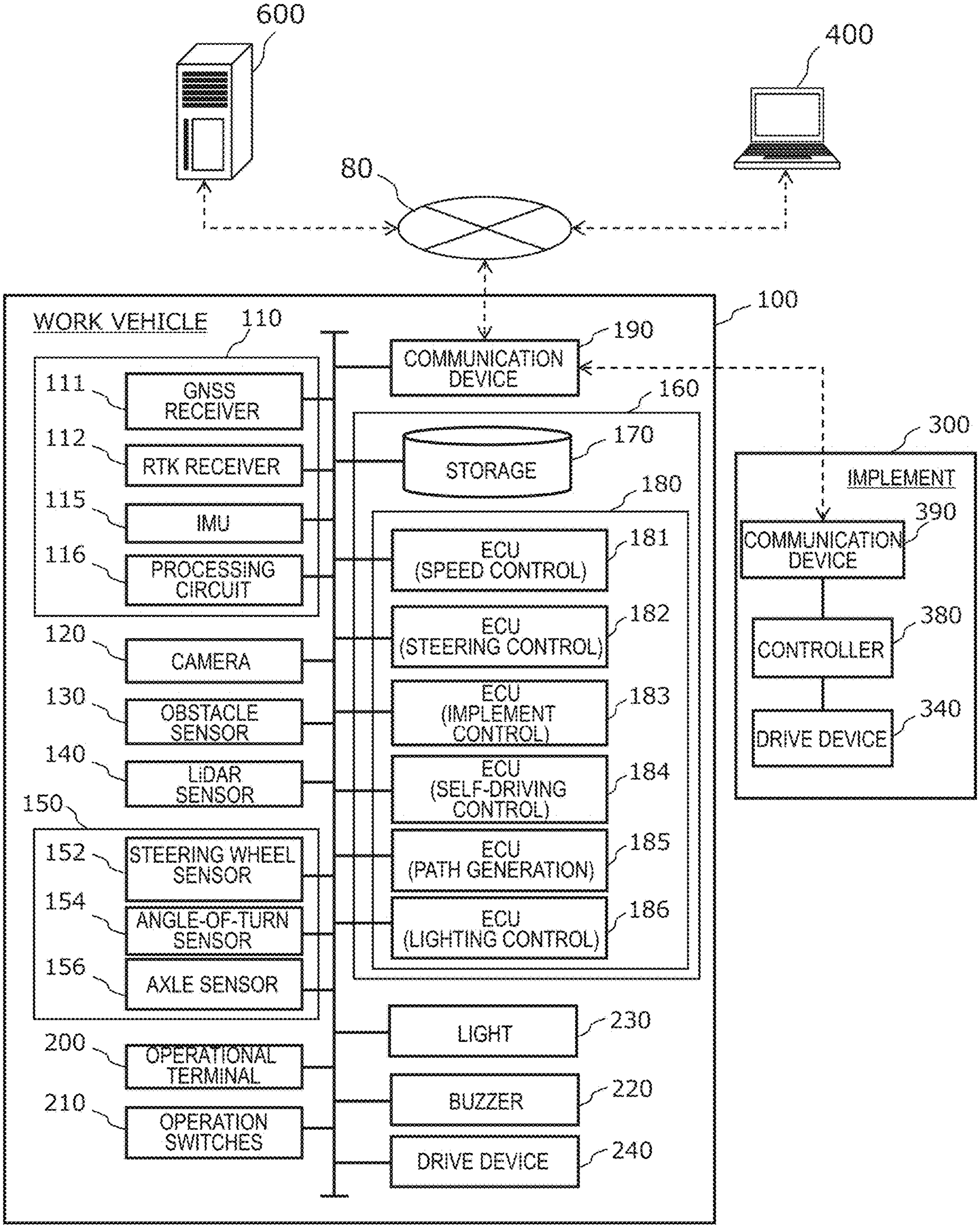
FIG. 3 is a block diagram showing an example configuration of the work vehicle and the implement.

FIG. 3 is a block diagram showing an example configuration of the work vehicle 100 and the implement 300. The work vehicle 100 and the implement 300 can communicate with each other via a communication cable that is included in the linkage device 108. The work vehicle 100 is able to communicate with the terminal device 400 and the management device 600 via the network 80.

In addition to the GNSS unit 110, the cameras 120, the obstacle sensors 130, the LiDAR sensor 140, the operational terminal 200, and the light 230, the work vehicle 100 in the example of FIG. 3 includes sensors 150 to detect the operating status of the work vehicle 100, a control system 160, a communication device 190, operation switches 210, a buzzer 220, and a drive device 240. These component elements are communicably connected to each other via a bus. The GNSS unit 110 includes a GNSS receiver 111, an RTK receiver 112, an inertial measurement unit (IMU) 115, and a processing circuit 116. The sensors 150 include a steering wheel sensor 152, an angle-of-turn sensor 154, and an axle sensor 156. The control system 160 includes a storage 170 and a controller 180. The controller 180 includes a plurality of electronic control units (ECU) 181 to 186. The implement 300 includes a drive device 340, a controller 380, and a communication device 390. Note that FIG. 3 shows component elements which are relatively closely related to the operations of self-driving by the work vehicle 100, while other components are omitted from illustration.

The GNSS receiver 111 in the GNSS unit 110 receives satellite signals transmitted from the plurality of GNSS satellites and generates GNSS data based on the satellite signals. The GNSS data is generated in a predetermined format such as, for example, the NMEA-0183 format. The GNSS data may include, for example, the identification number, the angle of elevation, the azimuth angle, and a value representing the reception strength of each of the satellites from which the satellite signals are received.

Figure 4:
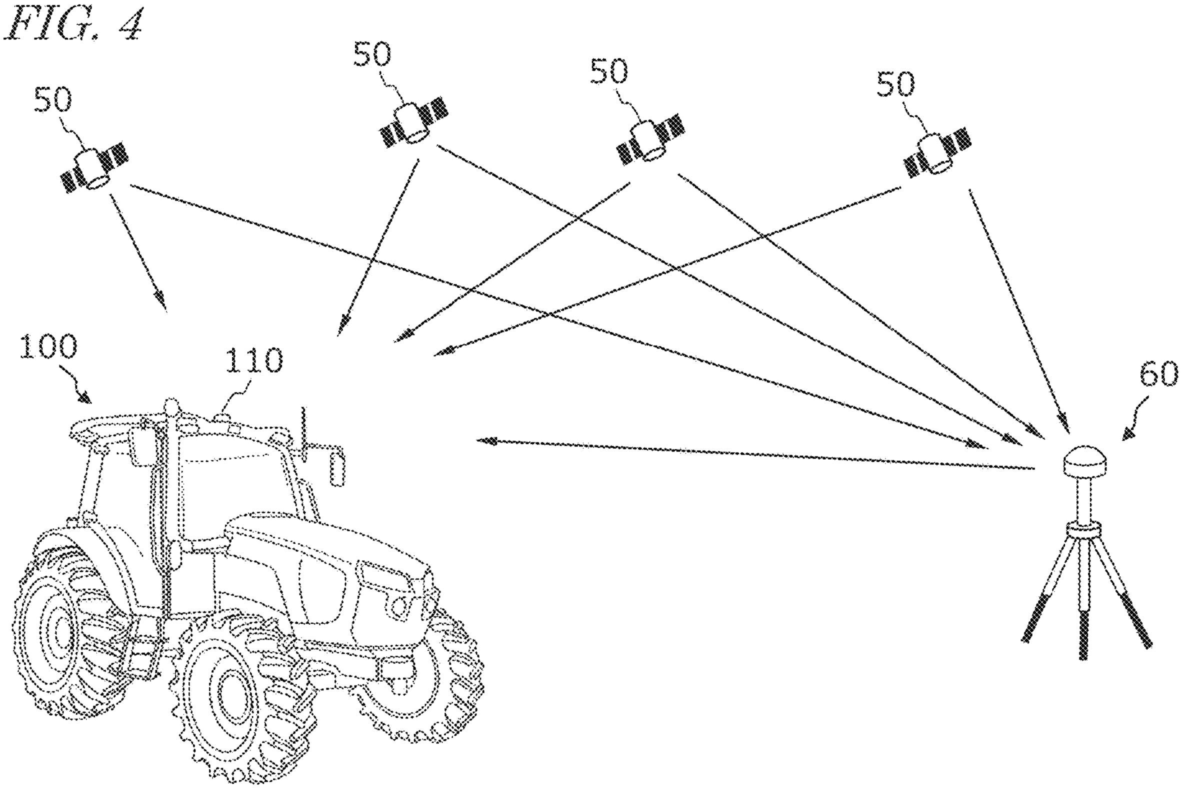
FIG. 4 is a conceptual diagram showing an example of the work vehicle performing positioning based on an RTK-GNSS.

The GNSS unit 110 shown in FIG. 3 performs positioning of the work vehicle 100 by utilizing an RTK (Real Time Kinematic)-GNSS. FIG. 4 is a conceptual diagram showing an example of the work vehicle 100 performing positioning based on the RTK-GNSS. In the positioning based on the RTK-GNSS, not only satellite signals transmitted from a plurality of GNSS satellites 50, but also a correction signal that is transmitted from a reference station 60 is used. The reference station 60 may be disposed near the field where the work vehicle 100 performs tasked travel (e.g., at a position within about 10 km of the work vehicle 100). The reference station 60 generates a correction signal of, for example, an RTCM format based on the satellite signals received from the plurality of GNSS satellites 50, and transmits the correction signal to the GNSS unit 110. The RTK receiver 112, which includes an antenna and a modem, receives the correction signal transmitted from the reference station 60. Based on the correction signal, the processing circuit 116 of the GNSS unit 110 corrects the results of the positioning performed by use of the GNSS receiver 111. Use of the RTK-GNSS enables positioning with an accuracy on the order of several centimeters of errors, for example. Positional information including latitude, longitude, and altitude information is acquired through the highly accurate positioning by the RTK-GNSS. The GNSS unit 110 calculates the position of the work vehicle 100 as frequently as, for example, one to ten times per second.

Note that the positioning method is not limited to being performed by use of an RTK-GNSS; any arbitrary positioning method (e.g., an interferometric positioning method or a relative positioning method) that provides positional information with the necessary accuracy can be used. For example, positioning may be performed by utilizing a VRS (Virtual Reference Station) or a DGPS (Differential Global Positioning System). In the case where positional information with the necessary accuracy can be obtained without the use of the correction signal transmitted from the reference station 60, positional information may be generated without using the correction signal. In that case, the GNSS unit 110 does not need to include the RTK receiver 112.

Even in the case where the RTK-GNSS is used, at a site where the correction signal from the reference station 60 cannot be acquired (e.g., on a road far from the field), the position of the work vehicle 100 is estimated by another method with no use of the signal from the RTK receiver 112. For example, the position of the work vehicle 100 may be estimated by matching the data that is output from the LiDAR sensor 140 and/or the cameras 120 against a highly accurate environment map.

The GNSS unit 110 according to the present example embodiment further includes the IMU 115. The IMU 115 may include a 3-axis accelerometer and a 3-axis gyroscope. The IMU 115 may include a direction sensor such as a 3-axis geomagnetic sensor. The IMU 115 functions as a motion sensor which can output signals representing parameters such as acceleration, velocity, displacement, and attitude of the work vehicle 100. Based not only on the satellite signals and the correction signal but also on a signal that is output from the IMU 115, the processing circuit 116 can estimate the position and orientation of the work vehicle 100 with a higher accuracy. The signal that is output from the IMU 115 may be used for the correction or complementation of the position that is calculated based on the satellite signals and the correction signal. The IMU 115 outputs a signal more frequently than the GNSS receiver 111. Utilizing this signal that is output highly frequently, the processing circuit 116 allows the position and orientation of the work vehicle 100 to be measured more frequently (e.g., about 10 Hz or above). Instead of the IMU 115, a 3-axis accelerometer and a 3-axis gyroscope may be separately provided. The IMU 115 may be provided as a separate device from the GNSS unit 110.

The cameras 120 are imagers that image the surrounding environment of the work vehicle 100. Each of the cameras 120 includes an image sensor such as a CCD (Charge Coupled Device) or a CMOS (Complementary Metal Oxide Semiconductor), for example. In addition, each camera 120 may include an optical system including one or more lenses and a signal processing circuit. During travel of the work vehicle 100, the cameras 120 image the surrounding environment of the work vehicle 100, and generate image data (e.g., motion picture data). The cameras 120 are able to capture motion pictures at a frame rate of 3 frames/second (fps: frames per second) or greater, for example. The images generated by the cameras 120 may be used by a remote supervisor to check the surrounding environment of the work vehicle 100 with the terminal device 400, for example. The images generated by the cameras 120 may also be used for the purpose of positioning and/or detection of obstacles. As shown in FIG. 2, the plurality of cameras 120 may be provided at different positions on the work vehicle 100, or a single camera 120 may be provided. A visible camera(s) to generate visible light images and an infrared camera(s) to generate infrared images may be separately provided. Both of a visible camera(s) and an infrared camera(s) may be provided as cameras for generating images for monitoring purposes. The infrared camera(s) may also be used for detection of obstacles at nighttime.

The obstacle sensors 130 detect objects existing in the surroundings of the work vehicle 100. Each of the obstacle sensors 130 may include a laser scanner or an ultrasonic sonar, for example. When an object exists at a position within a predetermined distance from one of the obstacle sensors 130, the obstacle sensor 130 outputs a signal indicating the presence of the obstacle. The plurality of obstacle sensors 130 may be provided at different positions on the work vehicle 100. For example, a plurality of laser scanners and a plurality of ultrasonic sonars may be disposed at different positions on the work vehicle 100. Providing such a great number of obstacle sensors 130 can reduce blind spots in monitoring obstacles in the surroundings of the work vehicle 100.

The steering wheel sensor 152 measures the angle of rotation of the steering wheel of the work vehicle 100. The angle-of-turn sensor 154 measures the angle of turn of the front wheels 104F, which are the steered wheels. Measurement values by the steering wheel sensor 152 and the angle-of-turn sensor 154 are used for steering control by the controller 180.

The axle sensor 156 measures the rotational speed, i.e., the number of revolutions per unit time, of an axle that is connected to the wheels 104. The axle sensor 156 may be a sensor including a magnetoresistive element (MR), a Hall generator, or an electromagnetic pickup, for example. The axle sensor 156 outputs a numerical value indicating the number of revolutions per minute (unit: rpm) of the axle, for example. The axle sensor 156 is used to measure the speed of the work vehicle 100.

The drive device 240 includes various types of devices required to cause the work vehicle 100 to travel and to drive the implement 300; for example, the prime mover 102, the transmission 103, the steering device 106, the linkage device 108 and the like described above. The prime mover 102 may include an internal combustion engine such as, for example, a diesel engine. The drive device 240 may include an electric motor for traction instead of, or in addition to, the internal combustion engine.

The buzzer 220 is an audio output device to present an alarm sound to alert the user of an abnormality. For example, the buzzer 220 may present an alarm sound when an obstacle is detected during self-driving. The buzzer 220 is controlled by the controller 180.

The storage 170 includes one or more storage mediums such as a flash memory or a magnetic disc. The storage 170 stores various data that is generated by the GNSS unit 110, the cameras 120, the obstacle sensors 130, the LiDAR sensor 140, the sensors 150, and the controller 180. The data that is stored by the storage 170 may include map data on the environment where the work vehicle 100 travels (environment map) and data on a target path for self-driving. The environment map includes information on a plurality of fields where the work vehicle 100 performs agricultural work and roads around the fields. The environment map and the target path may be generated by a processor in the management device 600. The controller 180 may be configured or programmed to perform a function of generating or editing an environment map and a target path. The controller 180 can edit the environment map and the target path, acquired from the management device 160, in accordance with the environment where the work vehicle 100 travels. The storage 170 also stores data on a work plan received by the communication device 190 from the management device 600. The work plan includes information on a plurality of tasks of agricultural work to be performed by the work vehicle 100 over a plurality of working days.

The storage 170 also stores a computer program(s) to cause each of the ECUs in the controller 180 to perform various operations described below. Such a computer program(s) may be provided to the work vehicle 100 via a storage medium (e.g., a semiconductor memory, an optical disc, etc.) or through telecommunication lines (e.g., the Internet). Such a computer program(s) may be marketed as commercial software.

The controller 180 includes the plurality of ECUs. The plurality of ECUs include, for example, the ECU 181 for speed control, the ECU 182 for steering control, the ECU 183 for implement control, the ECU 184 for self-driving control, the ECU 185 for path generation, and the ECU 186 for lighting control.

The ECU 181 controls the prime mover 102, the transmission 103 and brakes included in the drive device 240, thus controlling the speed of the work vehicle 100.

The ECU 182 controls the hydraulic device or the electric motor included in the steering device 106 based on a measurement value of the steering wheel sensor 152, thus controlling the steering of the work vehicle 100.

In order to cause the implement 300 to perform a desired operation, the ECU 183 controls the operations of the three-point link, the PTO shaft and the like that are included in the linkage device 108. Also, the ECU 183 generates a signal to control the operation of the implement 300, and transmits this signal from the communication device 190 to the implement 300.

Based on data output from the GNSS unit 110, the cameras 120, the obstacle sensors 130, the LiDAR sensor 140 and the sensors 150, the ECU 184 performs computation and control for achieving self-driving. For example, the ECU 184 specifies the position of the work vehicle 100 based on the data output from at least one of the GNSS unit 110, the cameras 120 and the LiDAR sensor 140. Inside the field, the ECU 184 may determine the position of the work vehicle 100 based only on the data output from the GNSS unit 110. The ECU 184 may estimate or correct the position of the work vehicle 100 based on the data acquired with the cameras 120 or the LiDAR sensor 140. Use of the data acquired with the cameras 120 or the LiDAR sensor 140 allows the accuracy of the positioning to be further improved. Outside the field, the ECU 184 estimates the position of the work vehicle 100 by use of the data output from the LiDAR sensor 140 or the cameras 120. For example, the ECU 184 may estimate the position of the work vehicle 100 by matching the data output from the LiDAR sensor 140 or the cameras 120 against the environment map. During self-driving, the ECU 184 performs computation necessary for the work vehicle 100 to travel along a target path, based on the estimated position of the work vehicle 100. The ECU 184 sends the ECU 181 a command to change the speed, and sends the ECU 182 a command to change the steering angle. In response to the command to change the speed, the ECU 181 controls the prime mover 102, the transmission 103 or the brakes to change the speed of the work vehicle 100. In response to the command to change the steering angle, the ECU 182 controls the steering device 106 to change the steering angle.

During travel of the work vehicle 100, the ECU 185 recognizes an obstacle existing in the surroundings of the work vehicle 100 based on the data output from the cameras 120, the obstacle sensors 130 and the LiDAR sensor 140. The ECU 185 may also determine a destination of the work vehicle 100 based on the work plan stored in the storage 170, and determine a target path from a beginning point to a target point of the movement of the work vehicle 100.

The ECU 186 controls the illumination and extinction of each light 230. ECU 186 may be configured to adjust the light output (e.g., luminous intensity) of each light 230. The ECU 186 may adjust the light output of the light 230 by changing the driving voltage or driving current that is input to the light 230.

Through the actions of these ECUs, the controller 180 realizes self-driving. During self-driving, the controller 180 controls the drive device 240 based on the measured or estimated position of the work vehicle 100 and on the target path. As a result, the controller 180 can cause the work vehicle 100 to travel along the target path.

The plurality of ECUs included in the controller 180 can communicate with each other in accordance with a vehicle bus standard such as, for example, a CAN (Controller Area Network). Instead of the CAN, faster communication methods such as Automotive Ethernet (registered trademark) may be used. Although the ECUs 181 to 186 are illustrated as individual blocks in FIG. 3, the function of each of the ECU 181 to 186 may be implemented by a plurality of ECUs. Alternatively, an onboard computer that integrates the functions of at least some of the ECUs 181 to 186 may be provided. The controller 180 may include ECUs other than the ECUs 181 to 186, and any number of ECUs may be provided in accordance with functionality. Each ECU includes a processing circuit including one or more processors.

The communication device 190 is a device including a circuit communicating with the implement 300, the terminal device 400 and the management device 600. The communication device 190 includes circuitry to perform exchanges of signals complying with an ISOBUS standard such as ISOBUS-TIM, for example, between itself and the communication device 390 of the implement 300. This allows the implement 300 to perform a desired operation, or allows information to be acquired from the implement 300. The communication device 190 may further include an antenna and a communication circuit to exchange signals via the network 80 with communication devices of the terminal device 400 and the management device 600. The network 80 may include a 3G, 4G, 5G, or any other cellular mobile communications network and the Internet, for example. The communication device 190 may have a function of communicating with a mobile terminal that is used by a supervisor who is situated near the work vehicle 100. With such a mobile terminal, communication may be performed based on any arbitrary wireless communication standard, e.g., Wi-Fi (registered trademark), 3G, 4G, 5G or any other cellular mobile communication standard, or Bluetooth (registered trademark).

The operational terminal 200 is a terminal for the user to perform a manipulation related to the travel of the work vehicle 100 and the operation of the implement 300, and is also referred to as a virtual terminal (VT). The operational terminal 200 may include a display device such as a touch screen panel, and/or one or more buttons. The display device may be a display such as a liquid crystal display or an organic light-emitting diode (OLED) display, for example. By manipulating the operational terminal 200, the user can perform various manipulations, such as, for example, switching ON/OFF the self-driving mode, recording or editing an environment map, setting a target path, and switching ON/OFF the implement 300. At least a part of these manipulations may also be realized by manipulating the operation switches 210. The operational terminal 200 may be configured so as to be detachable from the work vehicle 100. A user who is at a remote place from the work vehicle 100 may manipulate the detached operational terminal 200 to control the operation of the work vehicle 100. Instead of the operational terminal 200, the user may manipulate a computer on which necessary application software is installed, for example, the terminal device 400, to control the operation of the work vehicle 100.

Figure 5:
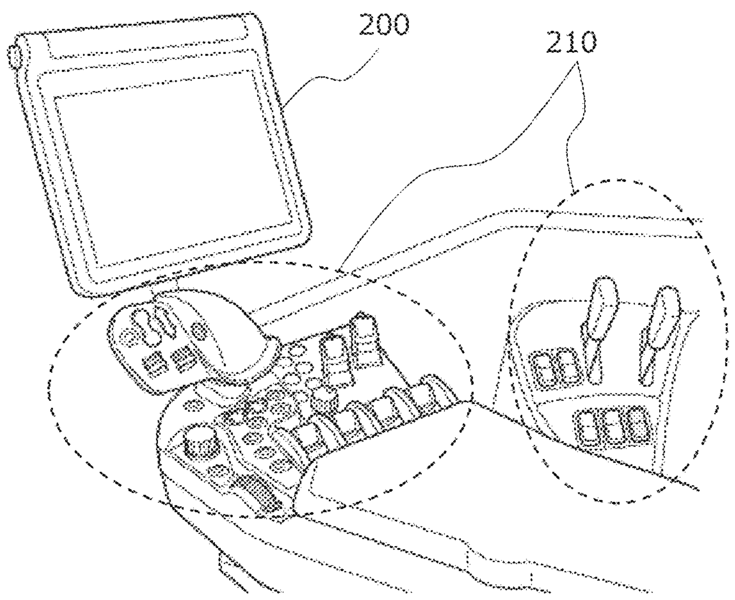
FIG. 5 is a diagram showing an example of an operational terminal and an example of operation switches disposed in a cabin.

FIG. 5 is a diagram showing an example of the operational terminal 200 and an example of the operation switches 210 both provided in the cabin 105. In the cabin 105, the operation switches 210, including a plurality of switches that are manipulable to the user, are disposed. The operation switches 210 may include, for example, a switch to select the gear shift as to a main gear shift or a range gear shift, a switch to switch between a self-driving mode and a manual driving mode, a switch to switch between forward travel and backward travel, a switch to raise or lower the implement 300, and the like. In the case where the work vehicle 100 only performs unmanned driving and lacks human driving functionality, the work vehicle 100 does not need to include the operation switches 210.

The drive device 340 in the implement 300 shown in FIG. 3 performs operations necessary for the implement 300 to perform predetermined work. The drive device 340 includes a device suitable for uses of the implement 300, for example, a hydraulic device, an electric motor, a pump or the like. The controller 380 is configured or programmed to control the operation of the drive device 340. In response to a signal that is transmitted from the work vehicle 100 via the communication device 390, the controller 380 causes the drive device 340 to perform various operations. Moreover, a signal that is in accordance with the state of the implement 300 can be transmitted from the communication device 390 to the work vehicle 100.

Figure 6:
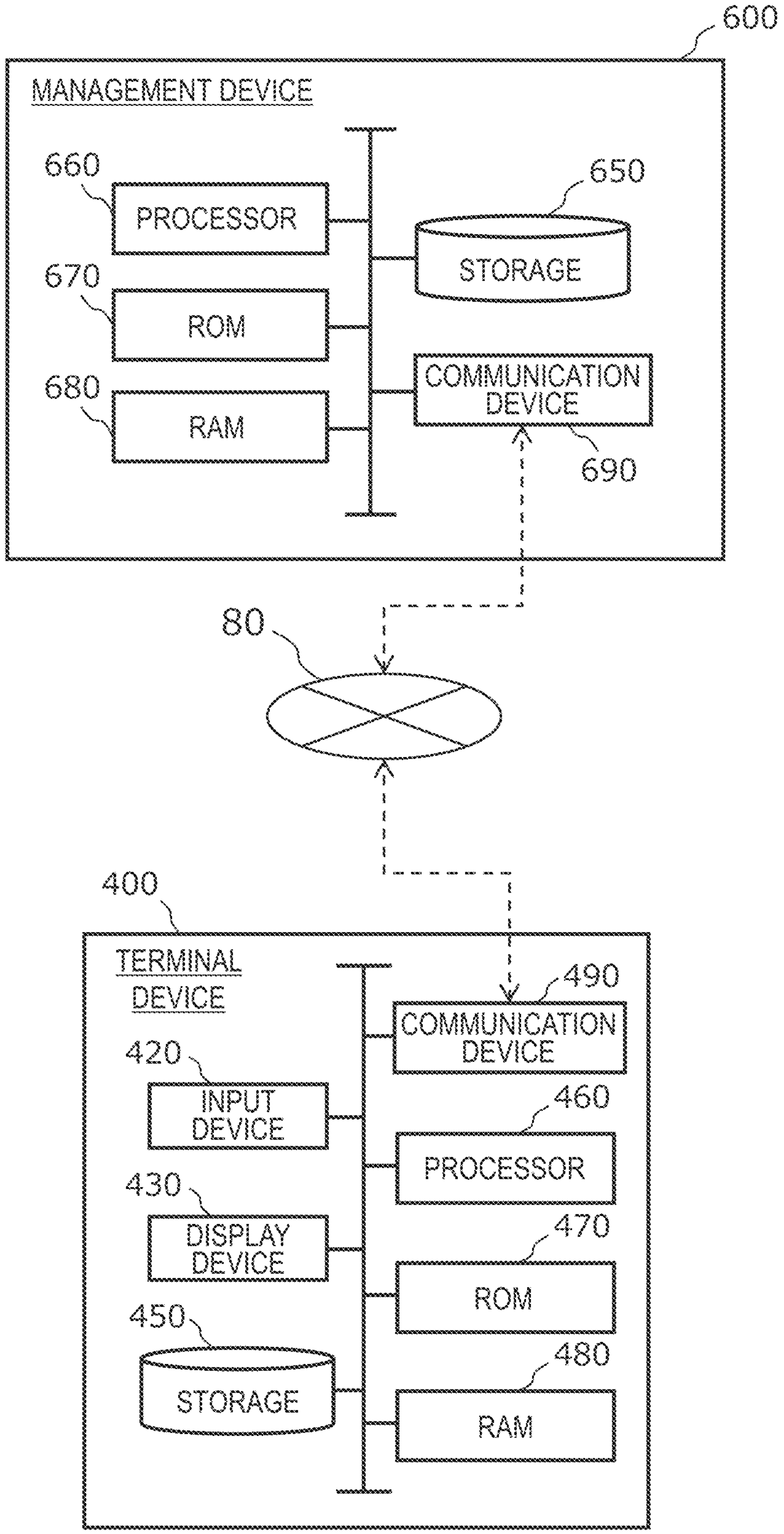
FIG. 6 is a block diagram showing an example of hardware configuration of a management device and a terminal device.

Now, a configuration of the management device 600 and the terminal device 400 will be described with reference to FIG. 6. FIG. 6 is a block diagram showing an example of schematic hardware configuration of the management device 600 and the terminal device 400.

The management device 600 includes a storage 650, a processor 660, a ROM (Read Only Memory) 670, a RAM (Random Access Memory) 680, and a communication device 690. These component elements are communicably connected to each other via a bus. The management device 600 may function as a cloud server to manage the schedule of the agricultural work to be performed by the work vehicle 100 in a field and support agriculture by use of the data managed by the management device 600 itself. The user can input information necessary to create a work plan by use of the terminal device 400 and upload the information to the management device 600 via the network 80. The management device 600 can create a schedule of agricultural work, that is, a work plan based on the information. The management device 600 can further generate or edit an environment map. The environment map may be distributed from a computer external to the management device 600.

The communication device 690 is a communication module to communicate with the work vehicle 100 and the terminal device 400 via the network 80. The communication device 690 can perform wired communication in compliance with communication standards such as, for example, IEEE1394 (registered trademark) or Ethernet (registered trademark). The communication device 690 may perform wireless communication in compliance with Bluetooth (registered trademark) or Wi-Fi, or cellular mobile communication based on 3G, 4G, 5G or any other cellular mobile communication standard.

The processor 660 may include, for example, a semiconductor integrated circuit including a central processing unit (CPU). The processor 660 may be realized by a microprocessor or a microcontroller. Alternatively, the processor 660 may be realized by an FPGA (Field Programmable Gate Array), a GPU (Graphics Processing Unit), an ASIC (Application Specific Integrated Circuit) or an ASSP (Application Specific Standard Product) each including a CPU, or a combination of two or more selected from these circuits. The processor 660 consecutively executes a computer program, describing commands to execute at least one process, stored in the ROM 670 and thus realizes a desired process.

The ROM 670 is, for example, a writable memory (e.g., PROM), a rewritable memory (e.g., flash memory) or a memory which can only be read from but cannot be written to. The ROM 670 stores a program to control operations of the processor 660. The ROM 670 does not need to be a single storage medium, and may be an assembly of a plurality of storage mediums. A portion of the assembly of the plurality of storage memories may be a detachable memory.

The RAM 680 provides a work area in which the control program stored in the ROM 670 is once developed at the time of boot. The RAM 680 does not need to be a single storage medium, and may be an assembly of a plurality of storage mediums.

The storage 650 mainly functions as a storage for a database. The storage 650 may be, for example, a magnetic storage or a semiconductor storage. An example of the magnetic storage is a hard disc drive (HDD). An example of the semiconductor storage is a solid state drive (SSD). The storage 650 may be a device independent from the management device 600. For example, the storage 650 may be a storage connected to the management device 600 via the network 80, for example, a cloud storage.

The terminal device 400 includes an input device 420, a display device 430, a storage 450, a processor 460, a ROM 470, a RAM 480, and a communication device 490. These component elements are communicably connected to each other via a bus. The input device 420 is a device to convert an instruction from the user into data and input the data to a computer. The input device 420 may be, for example, a keyboard, a mouse or a touch panel. The display device 430 may be, for example, a liquid crystal display or an organic EL display. The processor 460, the ROM 470, the RAM 480, the storage 450 and the communication device 490 are substantially the same as the corresponding component elements described above regarding the example of the hardware configuration of the management device 600, and will not be described in repetition.

Now, an operation of the work vehicle 100, the terminal device 400 and the management device 600 will be described.

First, an example operation of self-traveling of the work vehicle 100 will be described. The work vehicle 100 according to the present example embodiment can automatically travel both inside and outside a field. Inside the field, the work vehicle 100 drives the implement 300 to perform predetermined agricultural work while traveling along a preset target path. When detecting an obstacle by the obstacle sensors 130 (or based on data that is output from the LiDAR sensor 140 and the cameras 120) thereof while traveling inside the field, the work vehicle 100, for example, may halt traveling and perform operations of presenting an alarm sound from the buzzer 220, transmitting an alert signal to the terminal device 400 and the like. Inside the field, the positioning of the work vehicle 100 is performed based mainly on data output from the GNSS unit 110. Meanwhile, outside the field, the work vehicle 100 automatically travels along a target path set for an agricultural road or a general road outside the field. While traveling outside the field, the work vehicle 100 utilizes the data acquired by the cameras 120 or the LiDAR 140. When an obstacle is detected outside the field, the work vehicle 100, for example, avoids the obstacle or halts at the point. Outside the field, the position of the work vehicle 100 can be estimated based on data output from the LiDAR sensor 140 or the cameras 120 in addition to positioning data output from the GNSS unit 110.

Hereinafter, an example of the operation of the work vehicle 100 performing self-traveling inside the field will be described.

Figure 7:
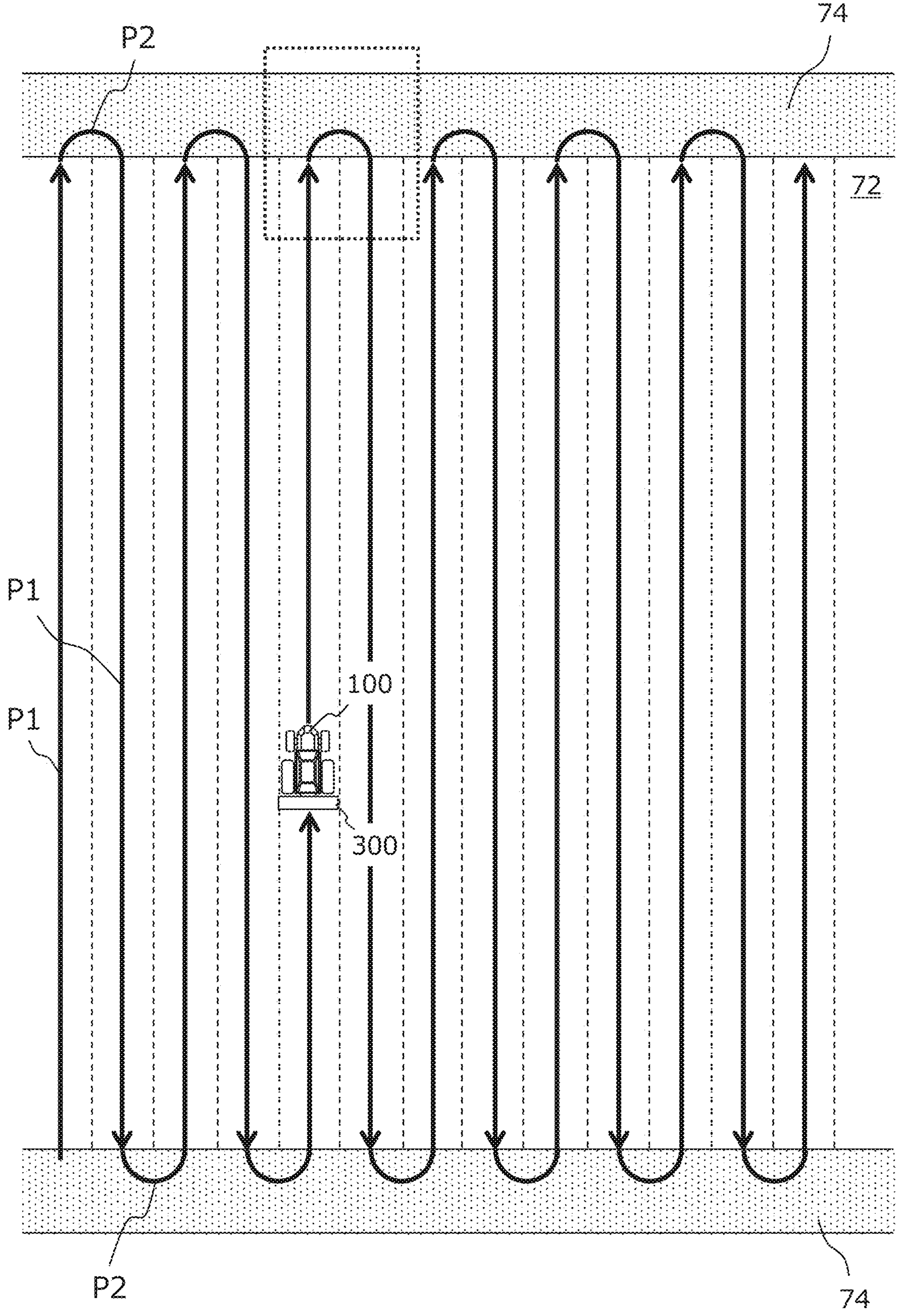
FIG. 7 is a diagram schematically showing an example of the work vehicle automatically traveling along a target path inside a field.

FIG. 7 is a diagram schematically showing an example of the work vehicle 100 automatically traveling along a target path in a field. In this example, the field includes a work area 72, in which the work vehicle 100 performs work by using the implement 300, and headlands 74, which are located near outer edges of the field. The user may previously specify which regions of the field on the map would correspond to the work area 72 and the headlands 74. The target path in this example includes a plurality of main paths P1 parallel to each other and a plurality of turning paths P2 interconnecting the plurality of main paths P1. The main paths P1 are located in the work area 72, whereas the turning paths P2 are located in the headlands 74. Although each of the main paths P1 in FIG. 7 is illustrated as a linear path, each main path P1 may also include a curved portion(s). Broken lines in FIG. 7 depict the working breadth of the implement 300. The working breadth is previously set and recorded in the storage 170. The working breadth may be set and recorded by the user manipulating the operational terminal 200 or the terminal device 400. Alternatively, the working breadth may be automatically recognized and recorded when the implement 300 is connected to the work vehicle 100. The interval between the plurality of main paths P1 may be set so as to be matched to the working breadth. The target path may be generated based on the manipulation made by the user, before self-driving is begun. The target path may be generated so as to cover the entire work area 72 in the field, for example. Along the target path shown in FIG. 7, the work vehicle 100 automatically travels while repeating a reciprocating motion from a beginning point of work to an ending point of work. Note that the target path shown in FIG. 7 is merely an example, and the target path may be arbitrarily determined.

Now, an example control performed by the controller 180 during self-driving inside the field will be described.

Figure 8:
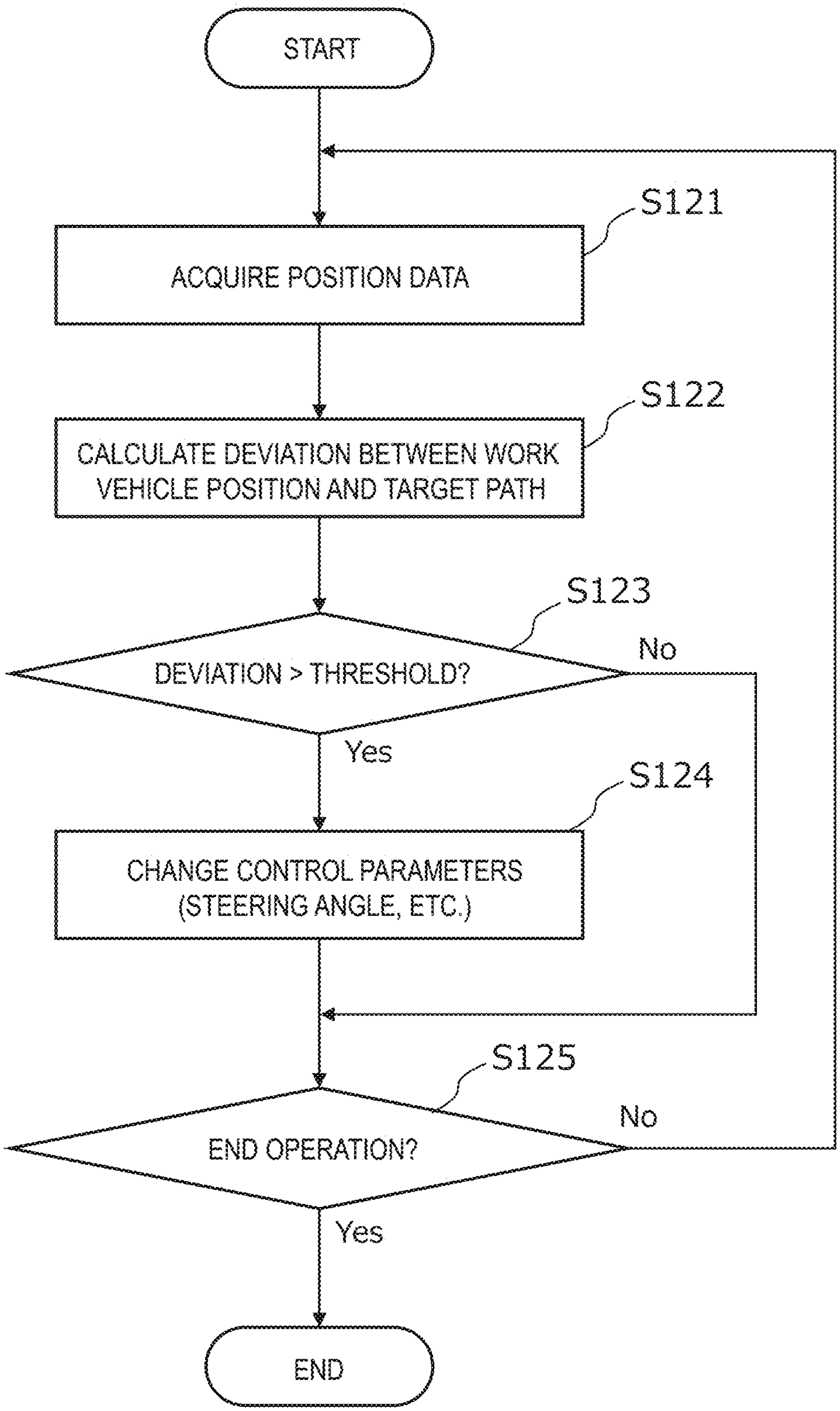
FIG. 8 is a flowchart showing an example operation of steering control during self-driving.

FIG. 8 is a flowchart showing an example operation of steering control to be performed by the controller 180 during self-driving. During travel of the work vehicle 100, the controller 180 is configured or programmed to perform automatic steering by performing the operation from steps S121 to S125 shown in FIG. 8. The speed of the work vehicle 100 will be maintained at a previously-set speed, for example. First, during travel of the work vehicle 100, the controller 180 acquires data representing the position of the work vehicle 100 that is generated by the GNSS unit 110 (step S121). Next, the controller 180 calculates a deviation between the position of the work vehicle 100 and the target path (step S122). The deviation represents the distance between the position of the work vehicle 100 and the target path at that moment. The controller 180 determines whether the calculated deviation in position exceeds the previously-set threshold or not (step S123). If the deviation exceeds the threshold, the controller 180 changes a control parameter of the steering device included in the drive device 240 so as to reduce the deviation, thus changing the steering angle (step S124). If the deviation does not exceed the threshold at step S123, the operation of step S124 is omitted. At the following step S125, the controller 180 determines whether a command to end the operation has been received or not. The command to end the operation may be given when the user has instructed that self-driving be suspended through remote operations, or when the work vehicle 100 has arrived at the destination, for example. If the command to end the operation has not been given, the control returns to step S121 and the controller 180 performs substantially the same operation based on a newly measured position of the work vehicle 100. The controller 180 repeats the operation from steps S121 to S125 until a command to end the operation is given. The aforementioned operation is executed by the ECUs 182 and 184 in the controller 180.

In the example shown in FIG. 8, the controller 180 controls the drive device 240 based only on the deviation between the position of the work vehicle 100 as identified by the GNSS unit 110 and the target path. Alternatively, a deviation in terms of directions may further be considered in the control. For example, when a directional deviation exceeds a previously-set threshold, where the directional deviation is an angle difference between the orientation of the work vehicle 100 as identified by the GNSS unit 110 and the direction of the target path, the controller 180 may change the control parameter of the steering device of the drive device 240 (e.g., steering angle) in accordance with the deviation.

Hereinafter, with reference to FIGS. 9A to 9D, an example of steering control by the controller 180 will be described more specifically.

Figure 9A:
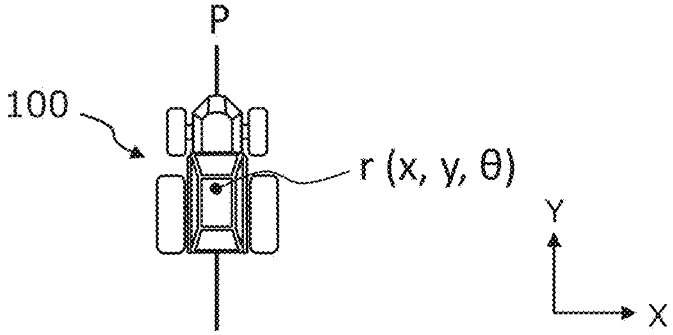
FIG. 9A is a diagram showing an example of the work vehicle traveling along a target path P.
Figure 9B:
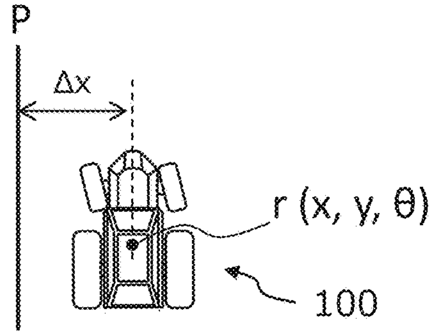
FIG. 9B is a diagram showing an example of the work vehicle at a position which is shifted rightward from the target path P.
Figure 9C:
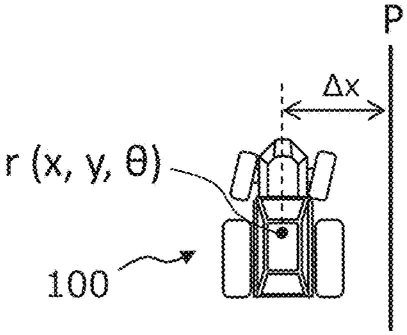
FIG. 9C is a diagram showing an example of the work vehicle at a position which is shifted leftward from the target path P.
Figure 9D:
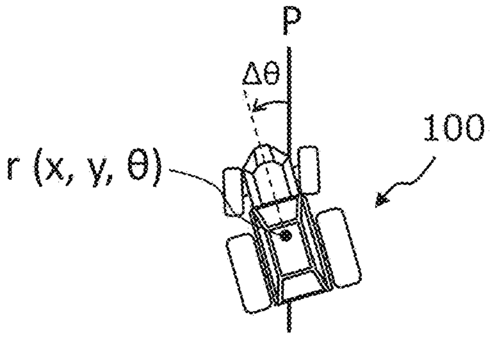
FIG. 9D is a diagram showing an example of the work vehicle oriented in an inclined direction with respect to the target path P.

FIG. 9A is a diagram showing an example of the work vehicle 100 traveling along a target path P. FIG. 9B is a diagram showing an example of the work vehicle 100 at a position which is shifted rightward from the target path P. FIG. 9C is a diagram showing an example of the work vehicle 100 at a position which is shifted leftward from the target path P. FIG. 9D is a diagram showing an example of the work vehicle 100 oriented in an inclined direction with respect to the target path P. In these figures, the pose, i.e., the position and orientation, of the work vehicle 100 as measured by the GNSS unit 110 is expressed as $r(x, y, \theta)$. Herein, $(x, y)$ are coordinates representing the position of a reference point on the work vehicle 100 in an XY coordinate system, which is a two-dimensional coordinate system fixed to the globe. In the examples shown in FIGS. 9A to 9D, the reference point on the work vehicle 100 is at a position, on the cabin, where a GNSS antenna is disposed, but the reference point may be at any arbitrary position. 6 is an angle representing the measured orientation of the work vehicle 100. Although the target path P is shown parallel to the Y axis in the examples illustrated in these figures, the target path P may not necessarily be parallel to the Y axis, in general.

As shown in FIG. 9A, in the case where the position and orientation of the work vehicle 100 are not deviated from the target path P, the controller 180 maintains the steering angle and speed of the work vehicle 100 without changing them.

As shown in FIG. 9B, when the position of the work vehicle 100 is shifted rightward from the target path P, the controller 180 changes the steering angle so that the traveling direction of the work vehicle 100 will be inclined leftward, thus bringing the work vehicle 100 closer to the path P. At this point, not only the steering angle but also the speed may be changed. The magnitude of the steering angle may be adjusted in accordance with the magnitude of a positional deviation $\Delta x$, for example.

As shown in FIG. 9C, when the position of the work vehicle 100 is shifted leftward from the target path P, the controller 180 changes the steering angle so that the traveling direction of the work vehicle 100 will be inclined rightward, thus bringing the work vehicle 100 closer to the path P. In this case, too, not only the steering angle but also the speed may be changed. The amount of change of the steering angle may be adjusted in accordance with the magnitude of the positional deviation $\Delta x$, for example.

As shown in FIG. 9D, in the case where the position of the work vehicle 100 is not considerably deviated from the target path P but its orientation is nonetheless different from the direction of the target path P, the controller 180 changes the steering angle so that the directional deviation $\Delta\theta$ will become smaller. In this case, too, not only the steering angle but also the speed may be changed. The magnitude of the steering angle may be adjusted in accordance with the magnitudes of the positional deviation $\Delta x$ and the directional deviation $\Delta\theta$, for example. For instance, the amount of change of the steering angle (which is in accordance with the directional deviation $\Delta\theta$) may be increased as the absolute value of the positional deviation $\Delta x$ decreases. When the positional deviation $\Delta x$ has a large absolute value, the steering angle will be changed greatly in order for the work vehicle 100 to return to the path P, so that the directional deviation $\Delta\theta$ will inevitably have a large absolute value. Conversely, when the positional deviation $\Delta x$ has a small absolute value, the directional deviation $\Delta\theta$ needs to become closer to zero. Therefore, it may be advantageous to introduce a relatively large weight (i.e., control gain) for the directional deviation $\Delta\theta$ in determining the steering angle.

For the steering control and speed control of the work vehicle 100, control techniques such as PID control or MPC (Model Predictive Control) may be applied. Applying these control techniques will make for smoothness of the control of bringing the work vehicle 100 closer to the target path P.

Note that, when an obstacle is detected by one or more obstacle sensors 130 (or based on data that is output from the LiDAR sensor 140 and the cameras 120) during travel, the controller 180, for example, halts the work vehicle 100. At this point, the controller 180 may cause the buzzer 220 to present an alarm sound or may transmit an alert signal to the terminal device 400. In the case where the obstacle is avoidable, the controller 180 may generate a local path that allows for avoiding the obstacle and control the drive device 240 such that the work vehicle 100 travels along the path.

The work vehicle 100 according to the present example embodiment can perform self-traveling outside a field as well as inside the field. Outside the field, the controller 180 is configured or programmed to detect an object located at a relatively distant position from the work vehicle 100 (e.g., another vehicle, a pedestrian, etc.) based on data output from the cameras 120 or the LiDAR sensor 140. The controller 180 is configured or programmed to perform speed control and steering control to avoid the detected obstacle. In this manner, self-traveling on a road outside the field can be realized.

Figure 10:
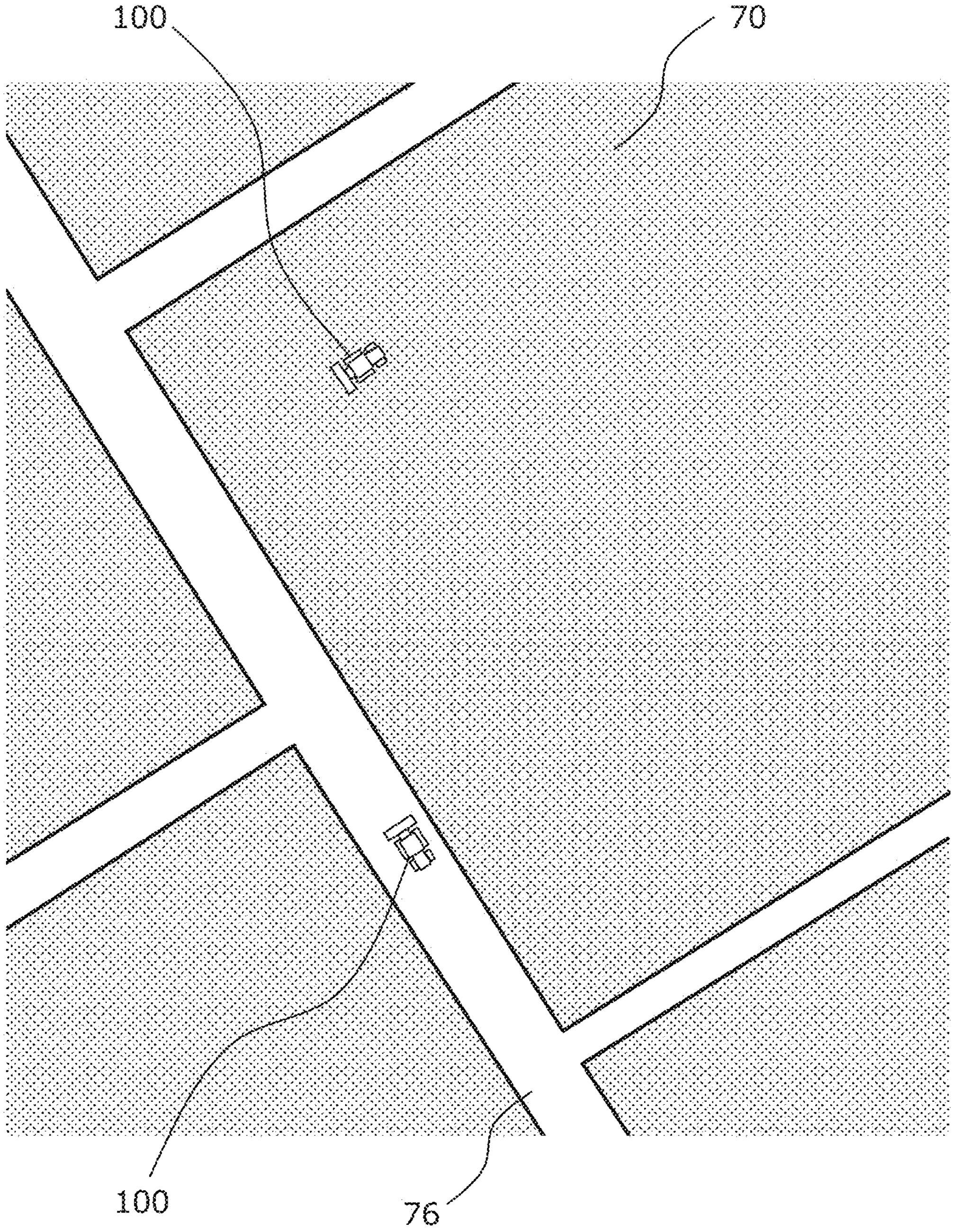
FIG. 10 is a diagram schematically showing an example state where a plurality of the work vehicles perform self-traveling inside a field and on a road outside the field.

As described above, the work vehicle 100 according to the present example embodiment can automatically travel inside the field and outside the field in an unmanned manner. FIG. 10 is a diagram schematically showing an example of state where a plurality of the work vehicles 100 are performing self-traveling inside a field 70 and on a road 76 outside the field 70. In the storage 170, an environment map of a region including a plurality of fields and roads around the fields, and a target path, are recorded. The environment map and the target path may be generated by the management device 600 or the ECU 185. In the case of traveling on a road, the work vehicle 100 travels along the target path while sensing the surroundings thereof by use of the sensing devices such as the cameras 120 and the LiDAR sensor 140, with the implement 300 being raised.

The controller 180 of the work vehicle 100 according to the present example embodiment is configured or programmed to function as an obstacle detection system for the work vehicle 100 in cooperation with a LiDAR sensor(s) 140 and a camera(s) 120.

The work vehicle 100 performs self-driving while sensing the surrounding environment with a LiDAR sensor(s) 140 and a camera(s) 120. The work vehicle 100 includes one or more LiDAR sensors 140 and one or more cameras 120, and performs self-driving while sensing the surrounding environment with at least one LiDAR sensor 140 and at least one camera 120 among them. Upon detecting, as a trigger, a candidate of an obstacle (hereinafter, "obstacle candidate") based on data that is output (e.g., point cloud data) from the LiDAR sensor(s) 140, the controller 180 causes the camera (s) 120 to acquire an image (e.g., a color image) of the obstacle candidate. The controller 180 further determines whether or not to change the traveling status of the work vehicle 100 based on the image of the obstacle candidate acquired with the camera(s) 120.

The "traveling status" of the work vehicle 100 is defined by parameters such as the speed, acceleration, and traveling direction of the work vehicle 100. The parameters determining the "traveling status" of the work vehicle 100 may include the target path of the work vehicle 100, and may include positional and directional information of each of a plurality of waypoints defining the target path. Changing the traveling status of the work vehicle 100 refers to changing at least one of the parameters defining the traveling status of the work vehicle 100. Changing the traveling status of the work vehicle 100 includes, for example, decelerating the work vehicle 100, halting the travel of the work vehicle 100, and changing the target path of the work vehicle 100. "Changing the traveling status of the work vehicle 100" is not limited to changing the current state of the work vehicle 100 (e.g., speed, acceleration, traveling direction, etc.), but also includes changing the future state of the work vehicle 100 (e.g., speed, acceleration, traveling direction, etc.) by changing the target path of the work vehicle 100 although the current state of the work vehicle 100 remains unchanged.

Figure 16:
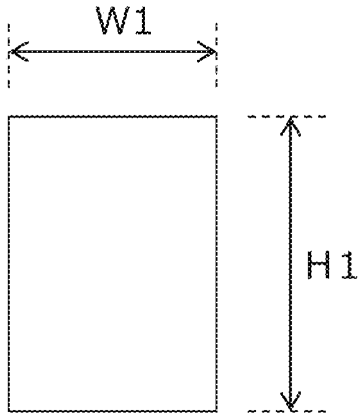
FIG. 16 is a diagram showing the size (height and width) of an object (detected object) sensed by the LiDAR sensors.

An "obstacle" is a subject with respect to which the traveling status of the work vehicle 100 should be changed, for instance, in order to avoid contact (including collision) with or approach to it. The subject that can be an obstacle is not limited to objects (including land objects, persons, animals, etc.), but can also include concavities or convexities on the ground surface. The obstacle also includes a stationary obstacle and a movable obstacle. The controller 180 detects any subject that can be an obstacle for the work vehicle 100 as an "obstacle candidate" based on data output from the LiDAR sensor(s) 140 within the range sensed by the LiDAR sensor(s) 140. The criteria for the controller 180 to detect obstacle candidates can be set in advance. For example, as shown in FIG. 16, the controller 180 refers to the size (height H1, width W1) of an object (a detected object) sensed by the LiDAR sensor(s) 140, and if the size (height H1, width W1) of the detected object is larger than or equal to the decision value, the controller 180 detects the object as the obstacle candidate. For example, the controller 180 can set the largest value of height of the detected object as the height H1 and the largest value of width of the detected object as the width W1. The decision value can be set only for either the object height or width, or for both the object height and width. The decision value, for example, is predetermined and stored in the storage 170 of the work vehicle 100. The decision value can be set by the user operating the operational terminal 200 and the terminal device 400 and stored. The decision value can vary depending on the distance from the LiDAR sensor (s) 140 to the detected object. For example, the controller 180 sets a smaller decision value as the distance from the LiDAR sensor(s) 140 to the detected object increases, and a larger decision value as the distance from the LiDAR sensor(s) 140 to the detected object decreases. Therefore, the shorter the distance from the LiDAR sensor (s) 140 to the detected object is, the larger objects are detected as obstacle candidates; and the longer the distance from the LiDAR sensor(s) 140 to the detected object is, the smaller objects are detected as obstacle candidates. The decision value can vary depending on the range sensed by the LiDAR sensor(s) 140. For example, as in the example of FIG. 11A described later, the controller 180 may set differing decision values for the range sensed by the LiDAR sensor 140*a*, which senses the front of the work vehicle 100, and for the range sensed by the LiDAR sensor 140*b*, which senses the rear of the work vehicle 100. For example, the decision value for the range sensed by the LiDAR sensor 140*a*, which senses the front of the work vehicle 100, can be set smaller than the decision value for the range sensed by the LiDAR sensor 140*b*, which senses the rear of the work vehicle 100.

The controller 180 may detect any objects within the range sensed by the LiDAR sensor(s) 140, excluding the ground surface, as obstacle candidates. Alternatively, the controller 180 may detect any objects within the range sensed by the LiDAR sensor(s) 140, further excluding any objects recorded on the environment map (objects such as buildings), as obstacle candidates. The controller 180 may detect any objects that are within or near the range which the work vehicle 100 occupies while the work vehicle 100 travels along the target path as obstacle candidates.

Figure 11A:
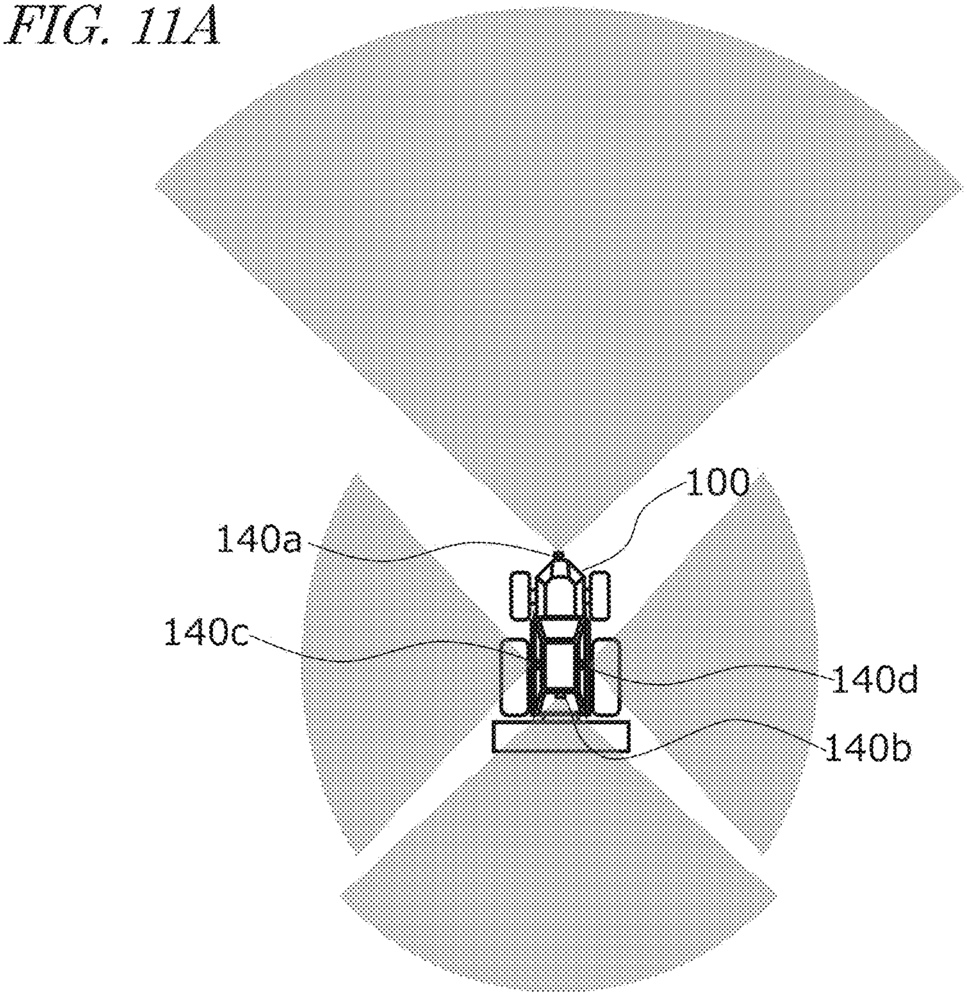
FIG. 11A is a diagram schematically showing an example of a region that LiDAR sensors of the work vehicle can sense.
Figure 11B:
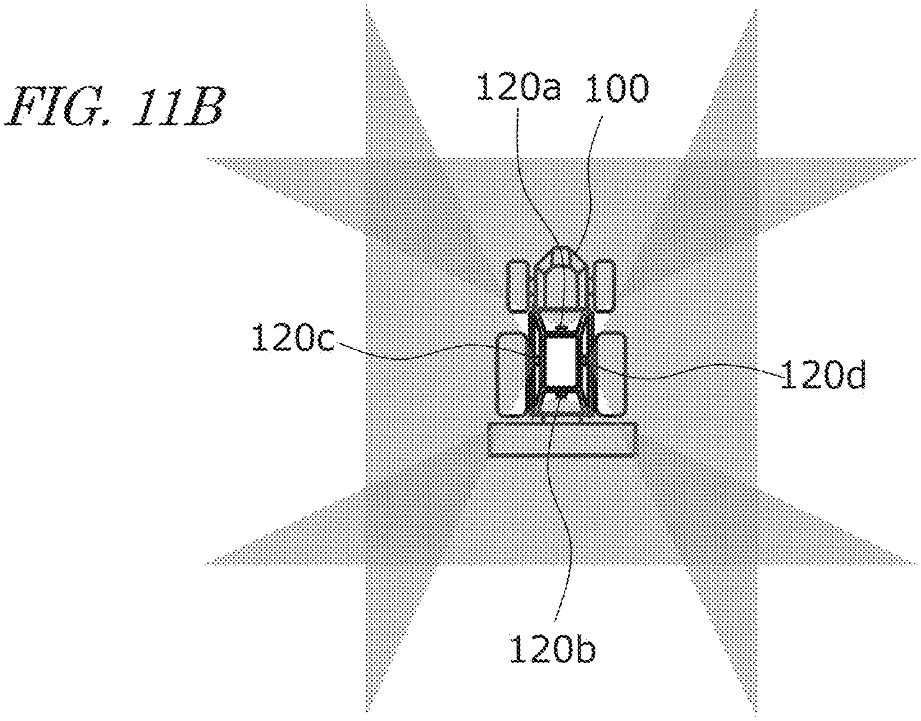
FIG. 11B is a diagram schematically showing an example of a region that LiDAR sensors of the work vehicle can sense.

FIGS. 11A and 11B schematically illustrate examples of the regions in which the LiDAR sensors 140 and the cameras 120 of the work vehicle 100 can sense. In the examples shown in FIGS. 11A and 11B, the work vehicle 100 includes four LiDAR sensors 140 (140*a*, 140*b*, 140*c*, and 140*d*) and four cameras 120 (120*a*, 120*b*, 120*c*, and 120*d*) that are provided at the front, the rear, the left side, and the right side of the work vehicle 100, and may sense the surrounding environment with them. In FIGS. 11A and 11B, examples of the ranges sensed by the LiDAR sensors 140 and the cameras 120 are shown as gray fans and triangles.

The LiDAR sensor (s) 140 emits pulses of laser beams (hereinafter abbreviated as "laser pulses") one after another while changing the emission direction, and is able to measure a distance to the position of each reflection point based on a time difference between the time of emission and the time when the reflected light of each laser pulse is received (ToF (Time of Flight) method). Alternatively, the LiDAR sensor(s) 140 may be a sensor(s) using Frequency Modulated Continuous Wave (FMCW) technology to perform ranging. A LiDAR sensor(s) using FMCW technology emits laser light that is linearly modulated in frequency, and is able to calculate a distance to the reflection point and velocity based on the frequency of a beat signal acquired by sensing coherent light between the emitted light and the reflected light. The "reflection point" can be a point on the surface of an object that is located in the surrounding environment of the work vehicle 100.

The LiDAR sensor(s) 140 can measure the distance from the LiDAR sensor(s) 140 to an object by any method. Examples of measurement methods for the LiDAR sensor(s) 140 are the mechanical rotation method, the MEMS method, and the phased array method. These measurement methods each differ in terms of how laser pulses are emitted (how scanning is performed). For example, a LiDAR sensor based on the mechanical rotation method scans the surrounding environment at 360 degrees in all directions around the rotation axis, by rotating a cylindrical head that performs emission of laser pulses and detection of reflection light of the laser pulses. A LiDAR sensor based on the MEMS method swings the direction of laser pulse emission by using MEMS mirrors and scans the surrounding environment within a predetermined angle range that is centered around the swing axis. A LiDAR sensor based on the phased array method swings the direction of light emission by controlling the light phase and scans the surrounding environment around a predetermined angular range that is centered around the swing axis.

Figure 12A:
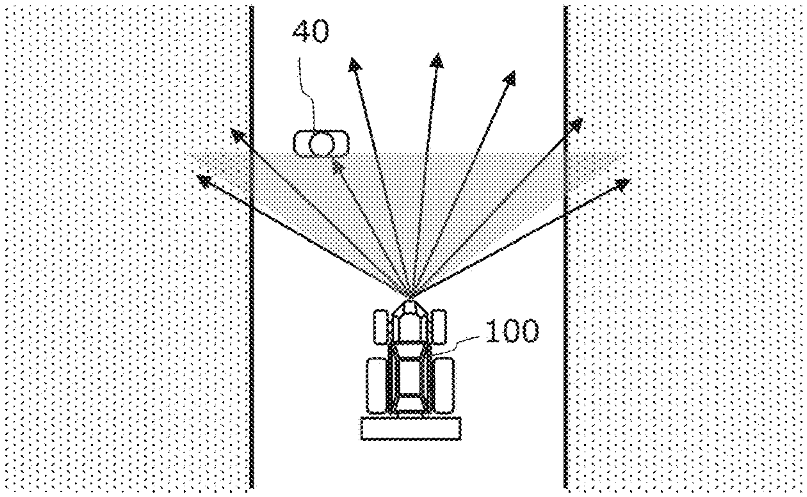
FIG. 12A is a diagram schematically showing an example traveling state of the work vehicle using the obstacle detection system.
Figure 12B:
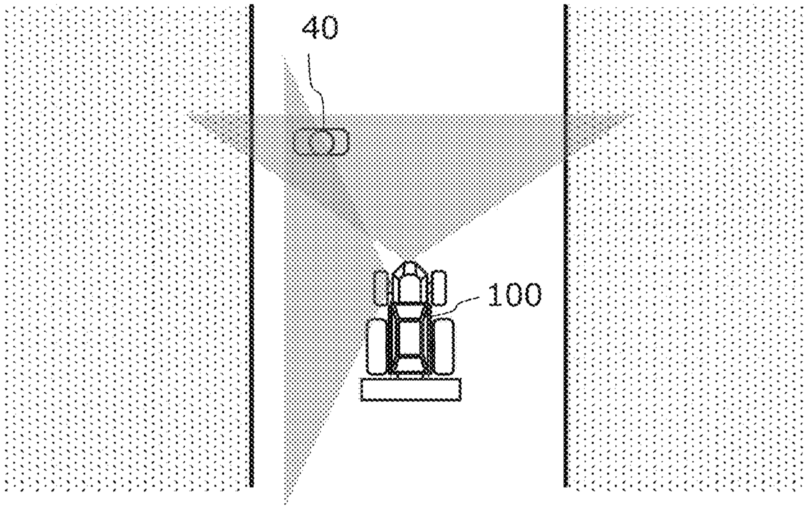
FIG. 12B is a diagram schematically showing an example traveling state of the work vehicle using the obstacle detection system.
Figure 12C:
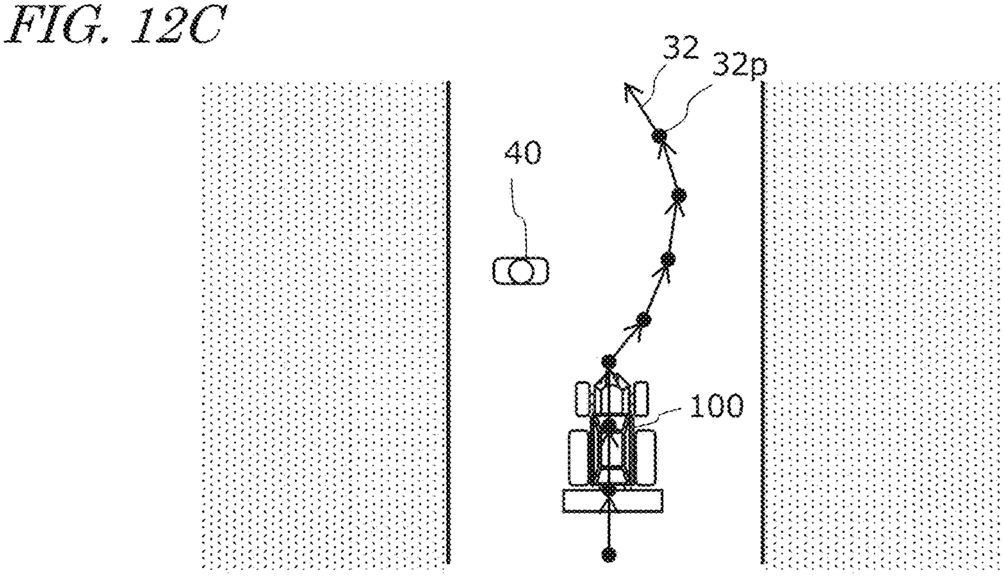
FIG. 12C is a diagram schematically showing an example traveling state of the work vehicle using the obstacle detection system.

FIGS. 12A, 12B, and 12C are diagrams schematically showing examples of the work vehicle 100 traveling by using the obstacle detection system. In the examples of FIGS. 12A, 12B, and 12C, the work vehicle 100 automatically travels on a road outside the field.

As shown in FIG. 12A, until an obstacle candidate 40 is detected, the work vehicle 100 is automatically traveling while sensing the surrounding environment with at least one LiDAR sensor 140 and at least one camera 120. In this example, the work vehicle 100 is automatically traveling while sensing the surrounding environment by using the LiDAR sensor 140*a* provided at the front of the work vehicle 100 and the camera 120*a* provided at the front of the work vehicle 100. In FIG. 12A, sensing by the LiDAR sensor 140*a* is shown schematically with arrows, and the sensing region by the camera 120*a* is shown schematically as a gray triangle. The controller 180 detects the obstacle candidate 40 based on data that is output from the LiDAR sensor 140*a*. Until the obstacle candidate 40 is detected by the sensing of the LiDAR sensor 140*a*, only a limited camera 120*a* among the four cameras 120*a* to 120*d* may be capturing the surrounding environment, while the remaining cameras 120*b* to 120*d* may not be capturing any images. The remaining cameras 120*b* to 120*d* may be in sleep mode, for example. Until the obstacle candidate 40 is detected, the controller 180 does not perform any process that uses the image captured by the camera 120*a* (i.e., any process to detect the obstacle candidate).

As shown in FIG. 12B, when the obstacle candidate 40 is detected, the controller 180 may selectively use (and activate, if necessary) one or more cameras 120 suitable for capturing the obstacle candidate 40 having been detected, and may have an image of the obstacle candidate 40 captured. The cameras 120 may include an actuator or other mechanisms to change their orientation. The controller 180 may change the orientation of the camera(s) 120 so that the field of view of the selected camera 120 includes the obstacle candidate 40. In this example, the camera 120*c* is activated in addition to the camera 120*a*, which was activated before detection of the obstacle candidate 40, and the cameras 120*a* and 120*c* are employed to capture the obstacle candidate 40. At this time, the controller 180 may cause the cameras 120*a* and/or 120*c* to capture an image of the obstacle candidate 40 at a higher magnification than when capturing the surrounding environment before detection of the obstacle candidate 40. Alternatively, the controller 180 may cause them to capture an image of the obstacle candidate 40 at a higher resolution than when capturing the surrounding environment before detection of the obstacle candidate 40, or at a higher frame rate than when capturing the surrounding environment before detection of the obstacle candidate 40. The controller 180 determines whether or not to change the traveling status of the work vehicle 100 based on the images of the obstacle candidate 40 acquired with the cameras 120*a* and 120*c*. For example, the controller 180 determines whether or not to change the traveling status of the work vehicle 100 so that the work vehicle 100 avoids contact with or approach to the obstacle candidate 40, by a recognition processing based on the images of the obstacle candidate 40 acquired with the cameras 120*a* and 120*c*.

FIG. 12C shows an example of determining to change the target path of the work vehicle 100 so as to avoid the obstacle candidate 40. A new target path 32 for the work vehicle 100 is set by a plurality of waypoints 32*p* that are newly set so as to avoid the obstacle candidate 40.

With the obstacle detection system according to the present example embodiment, it is possible to detect obstacles with good accuracy while reducing the processing load for obstacle detection. For example, if obstacles are to be detected by constantly using image data, the camera(s) will need to continuously acquire high-quality (high resolution) images, and the processing load for obstacle detection by using image data can be high. The power consumption of the controller performing the process of obstacle detection using image recognition techniques may also increase. When an agricultural machine is monitored or operated remotely, it is necessary to continuously transmit images acquired with the camera(s) via a network while the agricultural machine is traveling, which may increase the amount of communication.

In contrast, according to the obstacle detection system of the present example embodiment, the controller 180 is configured or programmed to detect obstacle candidates based on data that is output from the LiDAR sensor(s) 140, begin to scrutinize an obstacle candidate with image data only upon detection of the obstacle candidate, and determine whether the obstacle candidate should cause a change in the traveling status of the work vehicle 100 or not. This reduces the processing load for obstacle detection. Because obstacle candidates are detected in advance based on data that is output from the LiDAR sensor(s) 140, the camera(s) 120 can acquire images while focusing on a necessary range or subjects, which can reduce the processing load for obstacle detection while maintaining the accuracy of obstacle detection. Furthermore, obstacles can be detected with good accuracy using both data that is output from the LiDAR sensor(s) 140 and image data that is captured by the camera (s) 120. Obstacles can be detected with good accuracy by using both of data that is output from the LiDAR sensor (s) 140, which provides a distance to an object and a positional relationship with the object with high accuracy, and image data, which allows for performing object detection by using an image recognition technique. When the work vehicle 100 is being monitored remotely, image data may be transmitted via the network 80 to, for example, the management device 600 or the terminal device 400 only upon detection of an obstacle candidate, whereby an excessive increase in the amount of communication can be suppressed.

"Detecting an obstacle with high accuracy" includes, for example, suppressing misdetection of obstacles, reducing errors in the obstacle positions, reducing failures to detect obstacles which should have been detected, and so on. For example, suppressing misdetection of obstacles can reduce unnecessary changes in the traveling status of the work vehicle 100 (e.g., reduction of traveling speed, halting, change of the target path, etc.) that may be caused by misdetection of obstacles. As a result, the efficiency of movement through automatic travel by the work vehicle 100 and/or agricultural work performed by the work vehicle 100 can be increased.

For example, the controller 180 is configured or programmed to detect one or more objects in the surrounding environment of the work vehicle 100 based on data that is output from the LiDAR sensor(s) 140. When the controller 180 is configured or programmed to determine that the detected object is an obstacle candidate, the controller 180 causes the camera(s) 120 to acquire an image(s) of the obstacle candidate, and determines whether or not to change the traveling status of the work vehicle 100 based on the image(s) acquired with the camera(s) 120. The controller 180 may be configured or programmed to determine whether the detected object is an obstacle candidate by referring to an environment map and/or a target path in addition to the data that is output from the LiDAR sensor(s) 140. The environment map and the target path are stored, for example, in the storage 170 of the work vehicle 100. The controller 180 may be configured or programmed to obtain the environment map and the target path from the management device 600 or the terminal device 400 in determining whether the detected object is an obstacle candidate or not.

The work vehicle 100 exemplified here is a tractor to which an implement is attachable. When the work vehicle 100 has an implement attached thereto, the controller 180 may set the region to be scanned by the LiDAR sensor(s) 140 (i.e. the region to be sensed to detect an obstacle candidate) based on the type of the attached implement. The shape of the region to be scanned to detect an obstacle candidate may be set depending on the characteristics of the attached implement (e.g., width, height, weight, or horsepower). The type and/or characteristics of the implement attached to the work vehicle 100 are recorded in, for example, the storage 170 of the work vehicle 100. They may be automatically recognized and recorded when the implement becomes connected to the work vehicle 100.

Figure 13:
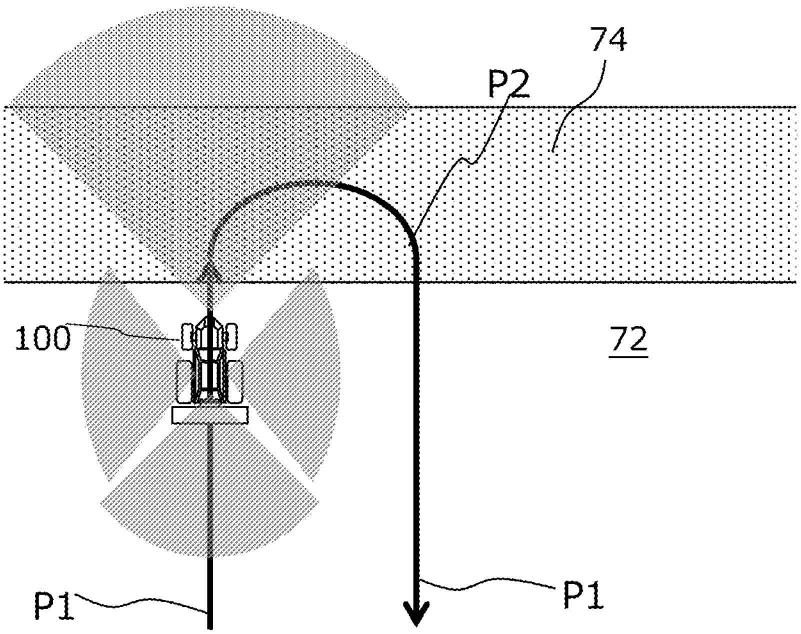
FIG. 13 is a diagram schematically showing an example traveling state of the work vehicle using the obstacle detection system.

The region scanned by the LiDAR sensor(s) 140 (i.e., the region to be sensed to detect an obstacle candidate) may be set depending on the location or the environment in which the work vehicle 100 travels. For example, when the work vehicle 100 travels straight on a road inside or outside a field, the front of the work vehicle 100 may be sensed mainly, as in the example shown in FIG. 12A. FIG. 13 schematically shows another example of the work vehicle 100 traveling by using the obstacle detection system. FIG. 13 shows an enlarged view of the region enclosed by the dotted line in FIG. 7, where the work vehicle 100 is automatically traveling in the field. For example, as in the example shown in FIG. 13, when the work vehicle 100 is traveling along a target path in the field and is about to travel along a turning path P2 from the work area 72 to a headland 74, it is preferable to use the LiDAR sensors 140*a* to 140*d* to sense the front, rear, left and right of the work vehicle 100. In FIG. 13, the sensing regions by the LiDAR sensors 140*a* to 140*d* are schematically shown in gray fan shapes.

Although the work vehicle 100 is illustrated as performing self-driving while sensing the surrounding environment with the LiDAR sensor(s) 140 and the camera(s) 120 which the work vehicle 100 includes, this is not a limitation. The work vehicle 100 may perform self-driving while sensing the surrounding environment with a LiDAR sensor(s) and a camera(s) which are included in any other movable unit, such as an agricultural machine that is distinct from the work vehicle 100, or a drone (Unmanned Aerial Vehicle: UAV). In that case, the controller 180 may function as an obstacle detection system that works in cooperation with the LiDAR sensor(s) and camera(s) included in the other movable unit. In cooperation with the other movable unit, the work vehicle 100 may perform self-driving and agricultural work by using the obstacle detection system.

In this example described here, the controller 180 is configured or programmed to function as a controller of an obstacle detection system. A plurality of ECUs included in the controller 180 may cooperate with each other to perform the processes. The controller 180 may further include ECUs to perform a portion of, or the entirety of, the processes to detect obstacles in addition to the exemplified ECUs 181 to 186. However, a portion of, or the entirety of the processes performed by the controller 180 in the obstacle detection system may be performed by other devices. Such other devices may be any of the management device 600 (the processor 660), the terminal device 400 (the processor 460), and the operational terminal 200. For example, when a portion of the processes performed by the controller 180 are performed by the processor 660 of the management device 600, the combination of the controller 180 and the management device 600 functions as a controller of the obstacle detection system.

In one example embodiment, "determining whether or not to change the traveling status of the work vehicle 100" means that the controller 180 and/or the other device(s) mentioned above perform processes using the image(s) of the obstacle candidate acquired with the camera(s) 120 in order to determine whether or not to change the traveling status of the work vehicle 100. More specifically, the device itself determines whether or not to change the traveling status of the work vehicle 100 by using image recognition techniques such as object detection. Known algorithms may be used for object detection. In another example embodiment, the image (s) of the obstacle candidate acquired with the camera(s) 120 is transmitted to an external device (e.g., a computer remotely monitoring the work vehicle 100), and it may be determined whether or not to change the traveling status of the work vehicle 100 based on a signal regarding whether or not to change the traveling status of the work vehicle 100 that is received from the external device. For example, a user who has examined the image(s) of the obstacle candidate acquired with the camera(s) 120 may input to the external device a signal regarding whether or not to change the traveling status of the work vehicle 100.

The obstacle detection system according to the present example embodiment may be used while the work vehicle 100 is automatically traveling in the field or on a road outside the field (a general road or an agricultural road). The work vehicle 100 automatically travels on a road inside or outside the field along the target path, for example. At this time, possible obstacles for which the work vehicle 100 should change its traveling status in order to avoid collision or contact may include, for example: what is inside the field, e.g., animals or persons entering the field, persons working in the field, other agricultural machines traveling in the field, and trees in the field; and, as for roads outside the field (especially agricultural roads), for example, persons or other agricultural machines traveling on the roads, animals or trees existing on the roads, and the like. The controller 180 may be configured or programmed to detect any object higher than a predetermined height as an obstacle candidate based on data that is output from the LiDAR sensor(s) 140 while the work vehicle 100 is traveling inside the field or on an agricultural road. The predetermined height may be set based on the type or characteristics (e.g., height, weight, horsepower, etc.) of the work vehicle 100 (inclusive of, when the work vehicle 100 has an implement attached thereto, that implement as well). The predetermined height may be changed depending on whether the work vehicle 100 is traveling inside the field or outside the field.

Among the examples of obstacles mentioned above, the appearance of persons or animals is often particularly difficult to predict. Therefore, the controller 180 may be configured to identify the type of the object assumed as an obstacle candidate based on the image of the obstacle candidate acquired with the camera(s) 120, and if the obstacle candidate is a person or an animal, cause the work vehicle 100 to stop traveling or change the target path of the work vehicle 100 so as to avoid the obstacle candidate. Grass (e.g., weeds) or trees may also be overgrown in the field or on roads outside the field (especially agricultural roads). For example, vegetation fluttering in the wind may momentarily intrude into the region scanned by the LiDAR sensor(s) 140 and be detected as obstacle candidates by the LiDAR sensor(s) 140, although by nature this is not something that should change the traveling status of the work vehicle 100. By first identifying whether the obstacle candidate is vegetation, the processing load for obstacle detection can be further reduced. The controller 180 may be configured or programmed to identify the type of the object assumed to be an obstacle candidate based on RGB values of a color image(s) of the obstacle candidate acquired with the camera(s) 120, for example. The controller 180 may be configured or programmed to identify whether the obstacle candidate is vegetation or not by detecting green pixels using the RGB values of the color image data of the obstacle candidate. For example, the controller 180 may be configured or programmed to detect leaves of vegetation by detecting green pixels from the color image data including the obstacle candidate and exclude the green pixels from the subject of recognition processing.

The controller 180 may be configured or programmed to cause the work vehicle 100 to stop traveling or to decelerate upon detecting the obstacle candidate as a trigger. That is, the controller 180 may be configured or programmed to cause the work vehicle 100 to stop traveling or to decelerate at the time when an obstacle candidate is detected, before even determining whether or not to change the traveling status of the work vehicle 100. After determining that the traveling status of the work vehicle 100 is not to be changed, the controller 180 is configured or programmed to cause the work vehicle 100 to resume traveling or to accelerate.

Figure 14:
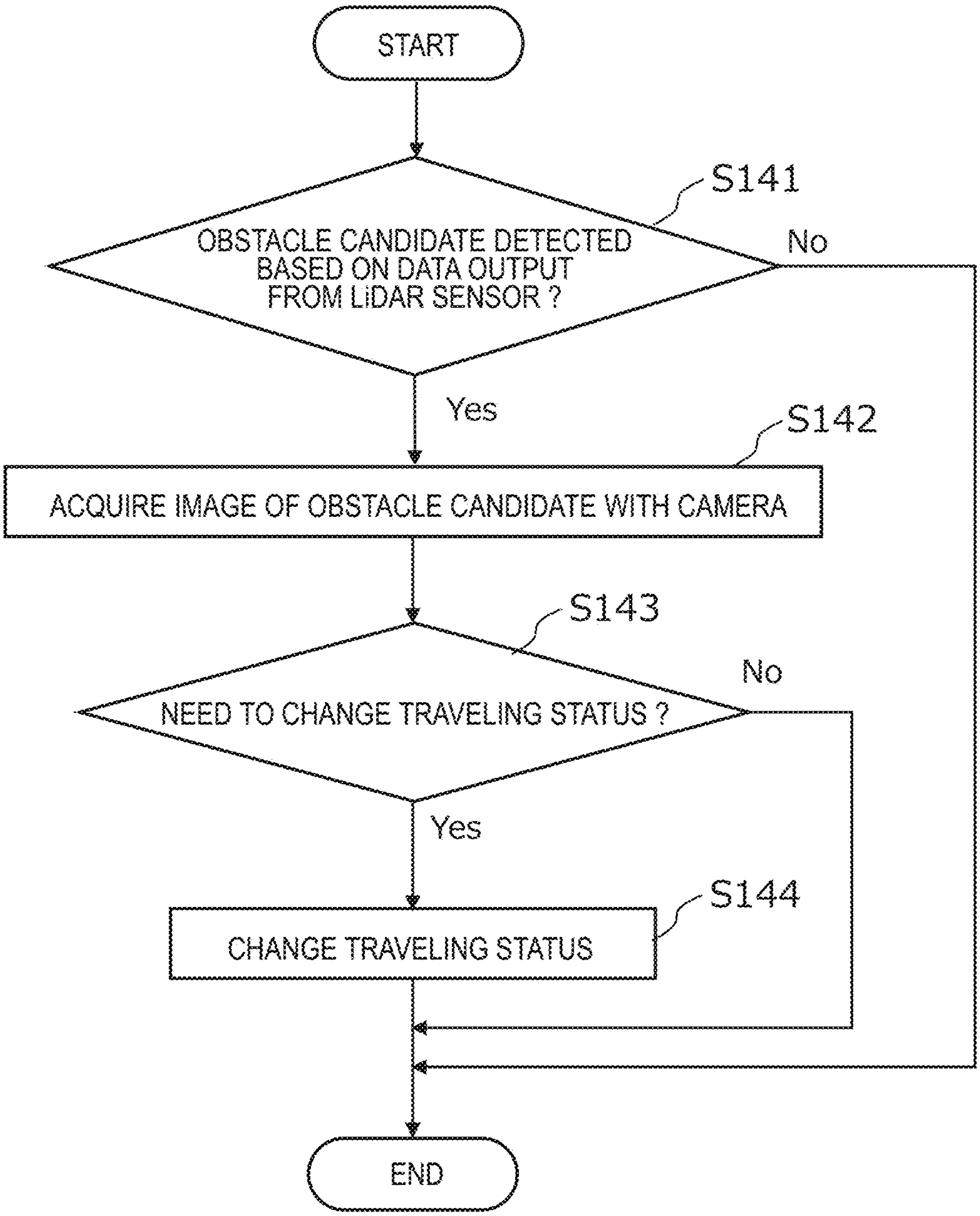
FIG. 14 is a flowchart showing an example of steps for the controller to detect an obstacle.

FIG. 14 is a flowchart showing an example of steps by which the controller 180 detects obstacles.

In step S141, an obstacle candidate is detected based on the data that is output from the LiDAR sensor(s) 140. The controller 180 detects the obstacle candidate referring to, for example, the environment map and/or the target path in addition to the data that is output from the LiDAR sensor(s) 140. The controller 180 may further obtain, based on the data that is output from the LiDAR sensor(s) 140, a distance between the detected obstacle candidate and the work vehicle 100, a positional relationship between the detected obstacle candidate and the work vehicle 100, and so on.

In step S142, the camera(s) 120 acquires the image of the obstacle candidate, upon detecting the obstacle candidate in step S141 as a trigger. Note that the work vehicle 100 is traveling while sensing the surrounding environment with the camera(s) 120 (e.g., capturing the surrounding environment with the camera(s) 120), even the detection of the obstacle candidate. For example, when an obstacle candidate is detected, the controller 180 may cause the camera(s) 120 to capture the obstacle candidate at a higher magnification than that of the image(s) of the surrounding environment captured with the camera(s) 120 before the detection of the obstacle candidate. The controller 180 may perform the below process before causing the camera(s) 120 to capture an image(s) of the obstacle candidate. For example, when the obstacle candidate is detected, it may be detected whether the obstacle candidate is included in the field of view of a camera 120 or not, and if the obstacle candidate is not included in the field of view of the camera 120, the orientation of the camera 120 may be changed so that the field of view of the camera 120 includes the obstacle candidate.

Alternatively, when the obstacle candidate is detected, before causing the camera(s) 120 to acquire the image(s) of the obstacle candidate, the controller 180 may turn on the light 230 to illuminate the surrounding environment of the work vehicle 100, or increase the illuminance of the light 230. The work vehicle 100 may further include one or more illuminance sensors. The controller 180, by judging whether or not a measurement value(s) of the illuminance measured by the illuminance sensor(s) of the work vehicle 100 is lower than or equal to a threshold, and if the measurement value(s) is lower than or equal to the threshold, may turn on the light 230 or increase the illuminance of the light 230. By turning on the light 230 or increasing the illuminance of the light 230, clearer images of the obstacle candidate can be obtained; and furthermore, it allows images of the obstacle candidate to be captured even at nighttime, for example. The controller 180 may change the orientation of the light 230 so that the light 230 illuminates the detected obstacle candidate.

In step S143, it is determined whether or not to change the traveling status of the work vehicle 100 based on the image(s) acquired with the camera(s) 120 in step S142. In determining whether or not to change the traveling status of the work vehicle 100, the controller 180 may use one, or a combination, of factors including: the type of the detected obstacle candidate; the distance between the obstacle candidate and the work vehicle 100; the positional relationship between the obstacle candidate and the work vehicle 100; the size of the obstacle candidate; the speed and other traveling status of the work vehicle at the time the obstacle candidate is detected; and so on. The conditions for determining whether or not to change the traveling status of the work vehicle 100 may be varied depending on whether the work vehicle 100 is traveling in the field, on an agricultural road outside the field, or on a general road outside the field.

If it is determined in step S143 that the traveling status of the work vehicle 100 is to be changed, the traveling status of the work vehicle 100 is changed at step S144. If it is determined in step S143 that the traveling status of the work vehicle 100 is not to be changed, it ends without changing the traveling status of the work vehicle 100.

Figure 15:
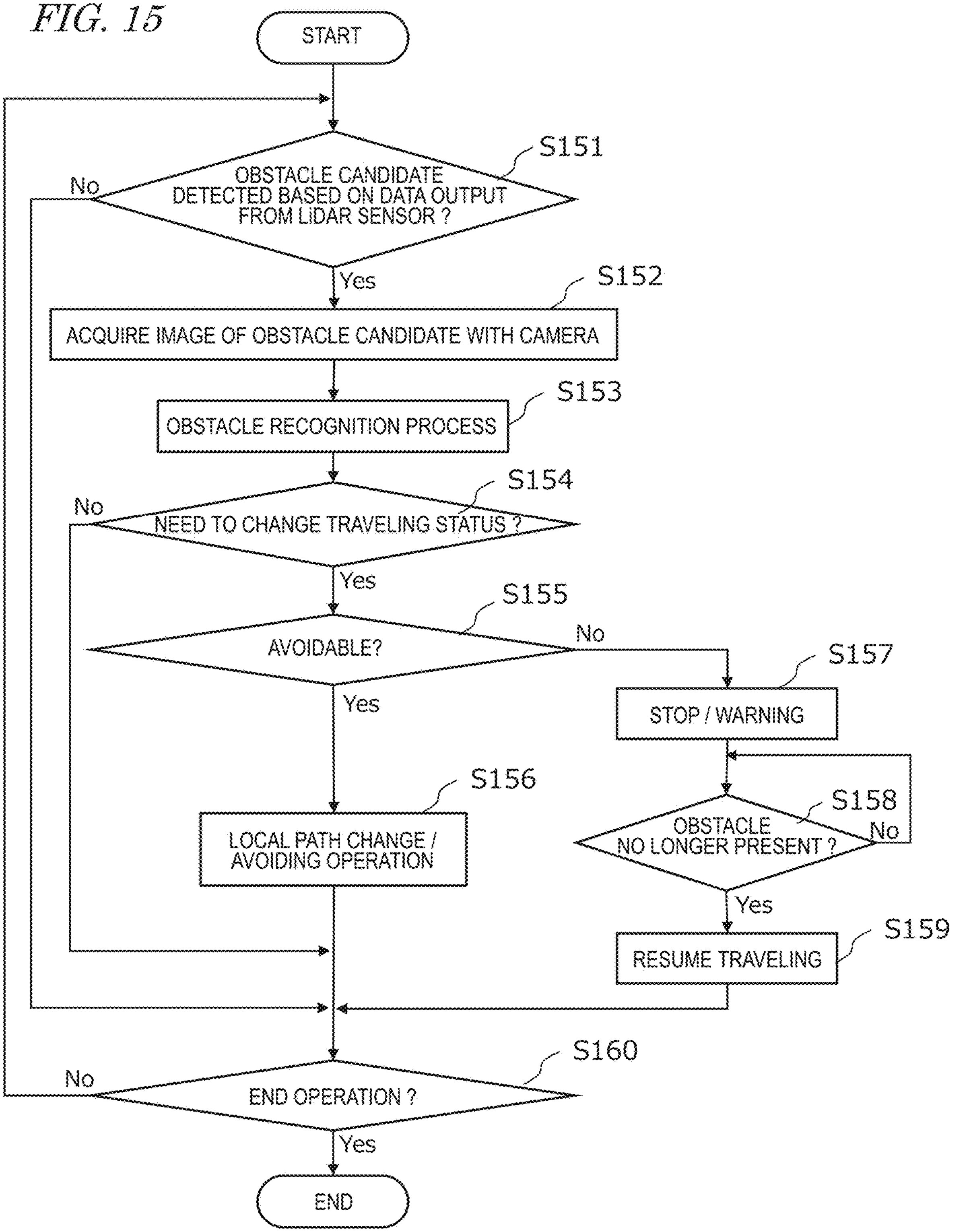
FIG. 15 is a flowchart showing an example of steps for the controller to detect an obstacle.

FIG. 15 is a flowchart showing another example of steps by which the controller 180 detects obstacles. Differences from the example of FIG. 14 are mainly explained below.

The controller 180, when an obstacle candidate is detected based on the data that is output from the LiDAR sensor(s) 140 (step S151), acquires an image (s) of the obstacle candidate by the camera(s) 120 (step S152). The controller 180 performs the obstacle recognition process by using the image(s) acquired with the camera(s) 120 (step S153) and determines whether or not to change the traveling status of the work vehicle 100 (step S154).

When it is determined that the traveling status of the work vehicle 100 is to be changed for avoiding the detected obstacle candidate, the ECU 185 determines whether a detour path that allows for avoiding the obstacle is generable (step S155). For example, as in the example of FIG. 12C, if the road traveled by the work vehicle 100 has any space available for detouring, it is determined that a detour path is generable. While the work vehicle 100 is traveling in the field, for example, if a detouring path that does not affect the agricultural work and crops is generable, it is determined that a detour path is generable. For example, if the work vehicle 100 is traveling while performing any agricultural work for which the generation of a detour path is prohibited in advance, or if detouring may result in a contact between the work vehicle 100 and the crops, it is determined that a detour path is not generable. For example, if it is possible to generate a detour path such that the detour path does not enter the already worked area in the field, it is determined that a detour path is generable.

When it is determined that a detour path is generable, the ECU 185 generates the detour path by changing the local path so as to avoid the obstacle, and the controller 180 causes the work vehicle 100 to travel along the detour path (step S156). When it is determined that a detour path is not generable, the controller 180 causes the work vehicle 100 to stop (step S157). In parallel, the controller 180 may perform the generation of a warning sound from the buzzer 220, and the transmission of a warning signal to the terminal device 400. If the object that is detected as an obstacle (e.g., a movable obstacle such as a person or animal) has moved, or the worker has removed the obstacle so that the obstacle is determined as no longer present (step S158), and the controller 180 causes the work vehicle 100 to resume traveling (step S159). The controller 180 repeats the operations of steps S151 to S159 until a command to end the operation is issued (step S160).

The techniques of example embodiments according to the present disclosure are applicable to obstacle detection systems for agricultural machines such as tractors, harvesters, rice transplanters, vehicles for crop management, vegetable transplanters, mowers, seeders, spreaders, or agricultural robots.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An obstacle detection system for an agricultural machine to perform self-driving while sensing a surrounding environment with a LIDAR sensor and a camera, the obstacle detection system comprising:

a controller configured or programmed to:

cause the camera, upon detecting an obstacle candidate based on data that is output from the LiDAR sensor, as a trigger, to acquire an image of the obstacle candidate;

determine whether or not to change a traveling status of the agricultural machine based on the image of the obstacle candidate acquired with the camera;

detect an object within the surrounding environment based on data that is output from the LiDAR sensor;

when the detected object is the obstacle candidate, cause the camera to acquire the image of the obstacle candidate and determine whether or not to change the traveling status of the agricultural machine based on the image;

identify, based on the image acquired with the camera, a type of the object that is the obstacle candidate;

when the obstacle candidate is a person or animal, cause the agricultural machine to stop traveling or to change a traveling path of the agricultural machine to avoid the obstacle candidate;

when the obstacle candidate is detected, cause the camera to acquire a color image of the obstacle candidate; and exclude, from data of the color image, green pixels from a subject of identifying the type of the object.

2. The obstacle detection system of claim 1, wherein the controller is further configured or programmed to cause the agricultural machine to stop traveling or to decelerate upon detecting the obstacle candidate as the trigger.

3. The obstacle detection system of claim 1, wherein the controller is further configured or programmed to cause the agricultural machine to resume travel or to accelerate when determining not to change the traveling status of the agricultural machine.

4. The obstacle detection system of claim 1, wherein the controller is further configured or programmed to detect an object that is higher than a predetermined height as the obstacle candidate based on data that is output from the LiDAR sensor while the agricultural machine is traveling in a field or on an agricultural road.

5. The obstacle detection system of claim 1, wherein the controller is further configured or programmed to:

cause the camera to acquire an image of the surrounding environment before the obstacle candidate is detected; and when the obstacle candidate is detected, cause the camera to capture the obstacle candidate at a higher magnification than that of the image of the surrounding environment.

6. The obstacle detection system of claim 1, wherein, if a field of view of the camera does not include the obstacle candidate when the obstacle candidate is detected, the controller is configured or programmed to change an orientation of the camera so that the field of view of the camera includes the obstacle candidate when the obstacle candidate is detected.

7. The obstacle detection system of claim 1, wherein the agricultural machine includes a light to illuminate the surrounding environment; and the controller is configured or programmed to turn on the light or increase an illuminance of the light when the obstacle candidate is detected.

* * * * *